(12) United States Patent
Shirai et al.

(10) Patent No.: US 7,996,335 B2
(45) Date of Patent: Aug. 9, 2011

(54) INFORMATION PROCESSING DEVICE, CONTENTS DISTRIBUTION SERVER, LICENSE SERVER, AND METHOD AND COMPUTER PROGRAM

(75) Inventors: Taizo Shirai, Tokyo (JP); Masafumi Kusakawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1817 days.

(21) Appl. No.: 10/680,381

(22) Filed: Oct. 8, 2003

(65) Prior Publication Data
US 2004/0128252 A1 Jul. 1, 2004

(30) Foreign Application Priority Data

Oct. 9, 2002 (JP) ................................. 2002-295715

(51) Int. Cl.
G06F 21/00 (2006.01)
(52) U.S. Cl. .............. 705/904; 705/51; 705/57; 705/58; 705/59; 705/901; 705/902; 705/903; 705/908; 705/911; 380/201; 380/202; 380/203; 380/204; 726/1
(58) Field of Classification Search .............. 705/51–59, 705/904
See application file for complete search history.

(56) References Cited

U.S. PATENT DOCUMENTS

| | | | | |
|---|---|---|---|---|
| 6,226,618 | B1 * | 5/2001 | Downs et al. ...................... | 705/1 |
| 6,463,468 | B1 * | 10/2002 | Buch et al. ..................... | 709/219 |
| 6,957,193 | B2 * | 10/2005 | Stefik et al. ..................... | 705/51 |
| 7,346,547 | B2 * | 3/2008 | Yamaguchi ..................... | 705/26 |
| 7,353,267 | B1 * | 4/2008 | Cunningham et al. ......... | 709/224 |
| 2001/0002851 | A1 * | 6/2001 | Shimada et al. ........... | 348/423.1 |
| 2003/0079133 | A1 * | 4/2003 | Breiter et al. ................. | 713/182 |
| 2004/0098592 | A1 * | 5/2004 | Taki .............................. | 713/176 |
| 2005/0086172 | A1 * | 4/2005 | Stefik .............................. | 705/51 |
| 2006/0129458 | A1 * | 6/2006 | Maggio ........................... | 705/14 |

FOREIGN PATENT DOCUMENTS

| | | |
|---|---|---|
| JP | 8-272745 | 10/1996 |
| JP | 9-282393 | 10/1997 |
| JP | 2001-215974 | 8/2001 |
| JP | 2002-7357 | 1/2002 |
| JP | 2002-49436 | 2/2002 |
| JP | 2002-63147 | 2/2002 |
| JP | 2002-063147 | 2/2002 |
| JP | 2002-229447 | 8/2002 |

(Continued)

OTHER PUBLICATIONS

Chong et al. "Security Attributes based Digital Rights Management" (Jun. 2002). Retrieved online Mar. 25, 2011. http://www.vf.utwente.nl/~summer/publications/Security%20Attribute%20based%20Digital%20Rights%20Management.pdf.*

(Continued)

*Primary Examiner* — James A Reagan
(74) *Attorney, Agent, or Firm* — Oblon, Spivak, McClelland, Maier & Neustadt, L.L.P.

(57) ABSTRACT

Usage rights information indicating a license which is usage rights corresponding to contents is stored in a license storage device, and at the time of using the contents, the rights information is output from the license storage device to a contents using device and further transmitted to a contents distribution server, and legitimacy verification of the rights information is executed at the contents distribution server, such that contents corresponding to the rights information are transmitted to the contents using device. Thus, a device and method is realized whereby distribution of contents over a network and use thereof is enabled without detracting from safety and user convenience.

16 Claims, 22 Drawing Sheets

FOREIGN PATENT DOCUMENTS

| | | | |
|---|---|---|---|
| JP | 2002-538703 | | 11/2002 |
| JP | 2003-505774 | | 2/2003 |
| WO | WO 00/52583 | * | 9/2000 |
| WO | WO 00/52853 | | 9/2000 |
| WO | WO 01/06469 A1 | | 1/2001 |
| WO | WO 01/43342 A1 | | 6/2001 |

OTHER PUBLICATIONS

Tateaki Anazawa, Open type super distribution base to realize the toughness of contents protection, Information Processing Society memoir, Japan, Information Processing Society of Japan, Nov. 30, 2001 vol. 2001 No. 118, p. 31-42.

* cited by examiner

FIG. 5A

CDS

| IDcds |
| --- |
| PRIcds |
| CERTcds |
| PUBca |
| DB |
| IDcont1 – Cont1–PUBrss1 |
| IDcont2 – Cont2–PUBrss2 |
| : |
| IDcont n – Cont n–PUBrss n |

FIG. 5B

CIS

| IDcis |
| --- |
| PRIcis |
| CERTcis |
| PUBca |
| DB |
| IDcont1 – IDcds1 |
| IDcont2 – IDcds2 |
| : |
| IDcont n – IDcds n |

FIG. 5C

RSS

| IDrss |
| --- |
| PRIrss |
| CERTrss |
| PUBca |
| DB |
| Right1 |
| Right2 |
| : |
| Right n |

FIG. 5D

PAS

| IDpas |
| --- |
| PRIpas |
| CERTpas |
| PUBca |
| DB |
| IDupd1 – Status1 |
| IDupd2 – Status2 |
| : |
| IDupd n – Status n |

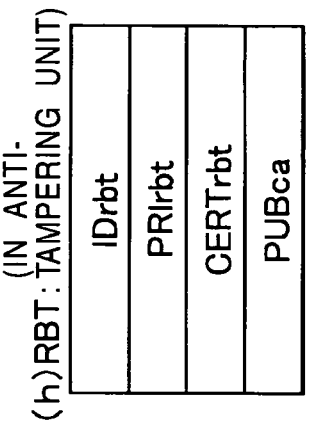
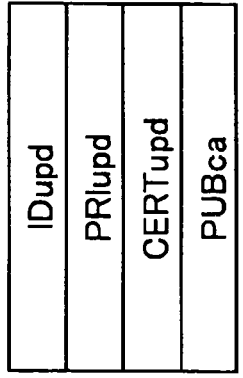
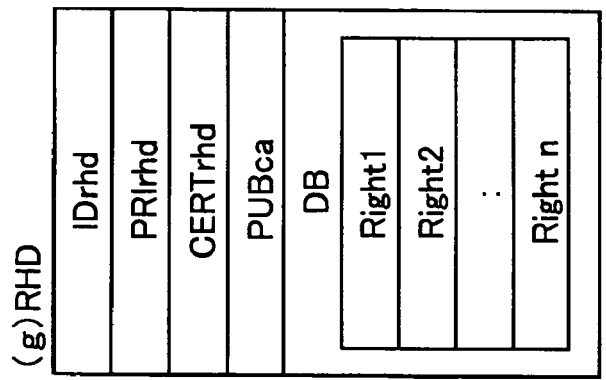
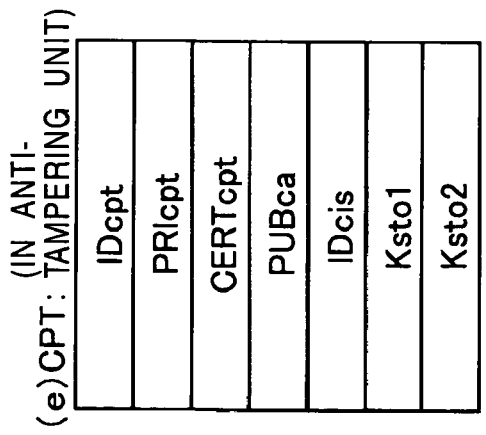
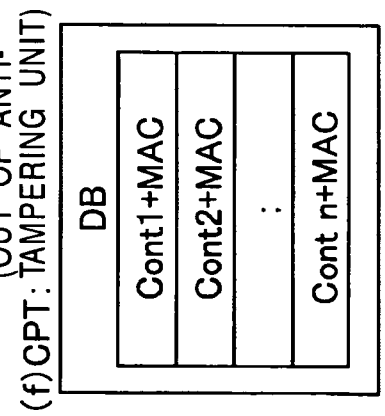

FIG. 7

CERTxxx

| IDcert |
|---|
| PUBxxx |
| Attribute=XXX |
| SIGca |

FIG. 9

| Right |
|---|
| FormatVersion |
| IDright |
| IDrhd |
| IDcds (optional) |
| IDcis (optional) |
| Download Type<br>(Download Cash OK, Download Cash NG, Streaming) |
| SIGrss |

| IDcont | Validation Code | Start | End | REMAINING COUNT |
|---|---|---|---|---|
| IDcont1 | VC1 | 2002/02/25, 0:00 | 2002/02/03, 0:00 | — |
| | VC2 | 2002/04/01, 0:00 | — | — |
| IDcont2 | VC1 | — | 2099/12/31, 23:59 | — |
| | VC2 | — | — | 10 |
| | VC3 | — | — | 10 |
| IDcont3 | VC1 | — | — | 20 |
| | VC2 | — | — | 99 |
| ⋮ | ⋮ | ⋮ | ⋮ | ⋮ |
| IDcont n | VCm | — | 2099/12/31, 23:59 | 50 |

FIG. 17

FORMAT

| AUDIO PLAYBACK CAPABILITIES | IMAGE PLAYBACK CAPABILITIES | COMMUNICATION PATH |
|---|---|---|

FORMAT

| 5.1ch | NTSC | 100Mbps |
|---|---|---|

FORMAT

| Stereo | 100 x 200 DOT MONITOR | 64Kbps |
|---|---|---|

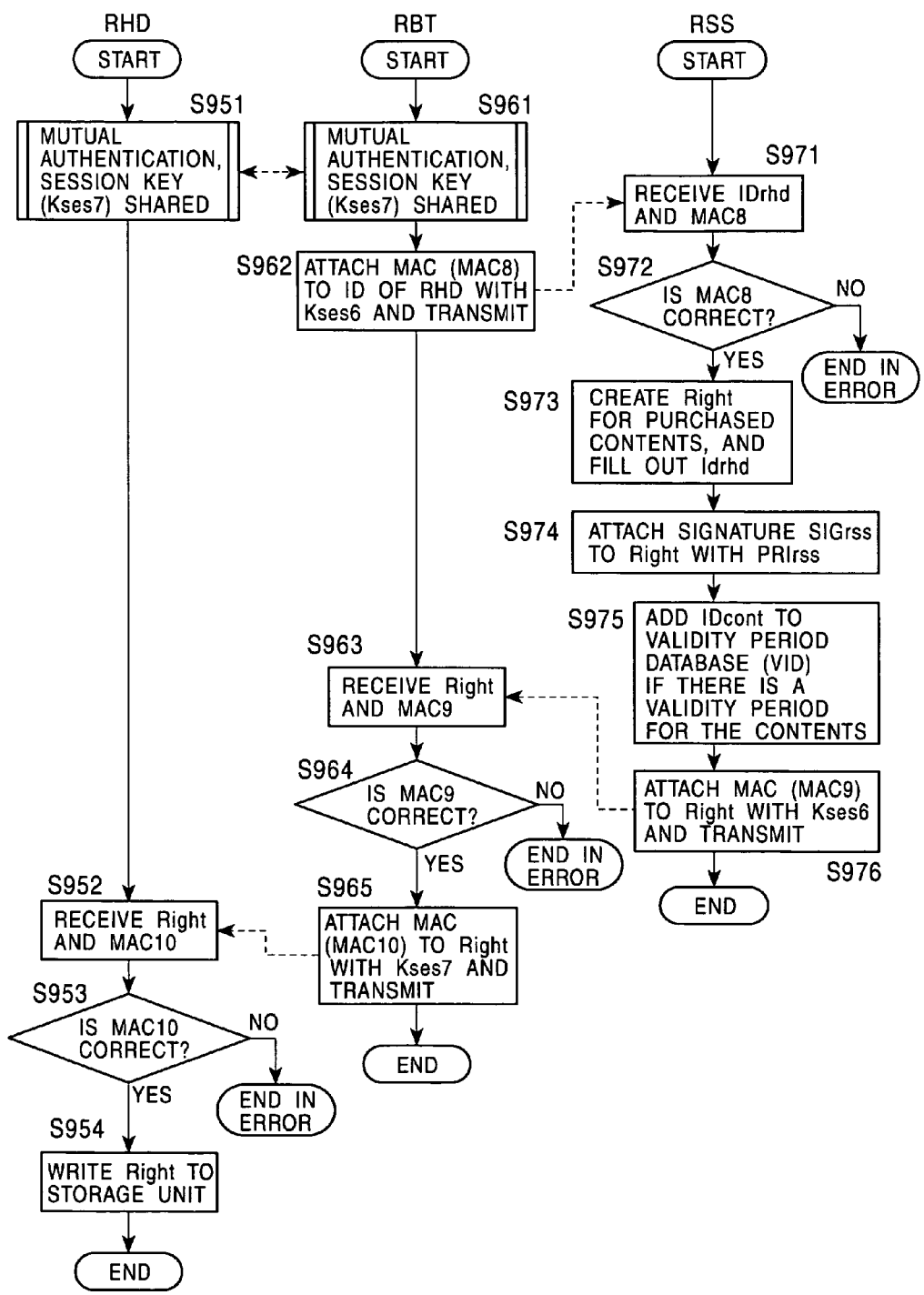

INFORMATION PROCESSING DEVICE, CONTENTS DISTRIBUTION SERVER, LICENSE SERVER, AND METHOD AND COMPUTER PROGRAM

BACKGROUND OF THE INVENTION

1. Field of the Invention

The present invention relates to a contents distribution and usage configuration wherein use of contents are enabled with confirmation of contents usage rights as a precondition thereof, and more particularly relates to an information processing device, contents distribution server, license server, and method and computer program, wherein a contents using device, configured of a contents player such as a personal computer or a dedicated player or the like, connects to a usage rights information storage device storing usage rights information of contents to obtain the usage rights information, and transmits the obtained usage rights information to a contents distribution server to obtain the contents, thereby enabling use of the contents.

2. Description of the Related Art

As of recent, various types of software data, such as music and other like audio data, movies and other like image data, game programs, application programs, etc. (hereafter, these and other like types of electronic data will be collectively referred to as "contents"), have come to be distributed via networks such as the Internet, and various types of recording media such as DVDs and CDs and the like. These distributed contents are used by personal computers, players, game devices, and so forth, owned by users.

Generally, with most types of contents such as music data or image data, the creator or distributor thereof holds the distribution rights thereof. Accordingly, the user receives and plays or uses the contents upon paying a usage fee for example to obtain usage rights for the contents. For example, in the event that the contents are distributed by storage media such as DVDs or CDs, the usage fee is collected at the time of sale of the storage media such as the DVD or CD, and in the event that the contents are being distributed via a network such as the Internet, the value of the contents, i.e., the usage fees, are collected from the user by obtaining user information such as the credit card No. of the user or the like at the time of distributing the contents.

With conventional network-distribution type pay contents distribution systems, once contents are purchased via a network by a terminal which is to use the contents, the playing rights information for the purchased contents is only valid within that terminal. That is to say, the contents usage rights are closed within the terminal, so the contents can be played or used at the contents purchasing terminal based on the usage rights obtained at the time of purchasing the contents, but the obtained contents cannot be used at other terminals or players or the like.

In the event that the user wants to play or use the same contents with multiple terminals, the user must purchase the same contents for each terminal, which is disadvantageous to the user since this forces the user to hold duplicate assets. Now, contents stored in storage media such as DVDs or CDs can be played or used on various players, meaning that the user is not presented with the above problem, most network-distribution type contents have an inseparable configuration with the usage rights thereof, and accordingly, use of the contents are restricted to the device or terminal which was used to purchase the contents. This is a problem, since network-distribution type contents are thus restricted in the format of use by the user in comparison with contents stored in storage media such as DVDs or CDs.

In order to configure a system wherein contents usage rights information can be moved between different players or terminals, a protocol needs to be established so that loss or duplication of rights never occurs when moving the usage rights information, so an architecture which does away with unauthorized obtaining and using of usage rights information is indispensable. Also, the rights information and contents data which the user has purchased legitimately is stored in a storage device capable of long-term storage, such as a hard disk within the terminal, flash memory, or the like, but in the event that the reliability of the storage device is not very high, the rights information or contents data may be unintentionally lost. Once this happens, the user will not be able to play or use the contents even though purchased legitimately.

Now, an arrangement might be conceived wherein a completely members-only contents distribution system is operated such that the purchase history of member users is saved at a center, and contents being purchased are distributed to the user following checking, but such a system places a great load on the administrative center, leading to increased costs. Further, with contents sold in conventional manners, as opposed to contents being left open for updates and services, contents once sold cannot be altered in any way for all practical purposes.

Also, configurations have been proposed wherein the number of times or the period of usage of the contents is set in the usage rights information of the contents, but in the event of confirming usage limitations (the number of times or period) with a contents using terminal, player, personal computer, or the like, all control is performed by software, which always leaves the possibility that a user with malicious intent might attack the software that is running and use the contents in unauthorized ways.

SUMMARY OF THE INVENTION

The present invention has been made in light of the above-described situation, and accordingly, it is an object thereof to provide a contents distribution and usage configuration wherein distribution of contents over a network and use thereof are enabled without detracting from safety and user convenience.

More specifically, it is an object of the present invention to provide an information processing device, contents distribution server, license server, and method and computer program, wherein a contents using device, configured of a device such as a personal computer, player, etc, for using the contents, connects to a license storage device storing usage rights information of contents to obtain the usage rights information, and transmits the obtained usage rights information to a contents distribution server to obtain the contents, thereby enabling use of the contents.

In order to achieve the above-described object, according to a first aspect of the present invention, an information processing device serving as a contents using device for playing or using contents, comprises: a communication unit for executing communication processing with a license storage device storing rights information serving as usage rights information of contents, and communication processing with a contents distribution server; an encryption processing unit for executing encryption processing including authentication processing in the communication processing; and a control unit for executing processing control for inputting rights information corresponding to contents from the license storage device, via the communication unit, transmitting the input rights information to the contents distribution server, and receiving contents set corresponding to the transmission rights information from the contents distribution server and playing or using the contents.

The encryption processing unit may have a configuration for executing verification processing for a tampering verification value attached to contents-corresponding rights information input from the license storage device.

The encryption processing unit may execute mutual authentication with the license storage device, with the control unit having a configuration for executing input processing of contents-corresponding rights information input from the license storage device via the communication unit, with the establishment of the mutual verification as a precondition thereof.

The encryption processing unit may have a configuration for executing mutual authentication and key-sharing processing with the license storage device, and for executing verification processing for a tampering verification value attached to contents-corresponding rights information input from the license storage device via the communication unit, applying a key generated in the key-sharing processing.

The rights information may store download-type information containing permit/forbid information relating to cache processing permission of distribution contents from the contents distribution server, with the control unit being of a configuration for deciding permission/forbidding of cache processing of download contents following the download type information.

The encryption processing unit may have a configuration for executing mutual authentication and key-sharing processing with the contents distribution server, and for executing verification processing for a tampering verification value attached to a contents file from the contents distribution server via the communication unit, applying a key generated in the key-sharing processing.

The encryption processing unit may have a configuration for executing mutual authentication and key-sharing processing with the contents distribution server, and for executing decryption of an encrypted contents encryption processing key attached to a contents file from the contents distribution server via the communication unit, applying a key generated in the key-sharing processing.

Also, header information of a contents file received from the contents distribution server may contain RHD check mode information setting whether or not to take connection with the license storage device at the time of playing contents as a precondition thereof, with the encryption processing unit executing mutual authentication processing with the license storage device for contents playing processing wherein the RHD check mode information takes connection with the license storage device at the time of playing contents as a precondition thereof, and the control unit performing contents playing processing with establishment of the authentication as a precondition thereof. Or, header information of a contents file received from the contents distribution server may contain output control information of contents, with the control unit executing output control of contents following the output control information.

The rights information may contain contents distribution server information or index server information of a server capable of providing contents corresponding to the rights information, with the control unit being of a configuration for executing processing for deciding a connection destination following the contents distribution server information or index server information. Also, the control unit may be of a configuration for executing processing for transmitting, to a contents distribution server providing contents, specs information including data format information of data formats playable at the information processing device serving as a contents using device, along with the rights information.

According to a second aspect of the present invention, an information processing device serving as a license storage device storing rights information which is contents use rights information, comprises: a storage unit for storing the use rights information; a communication unit for executing communication processing with a contents using device for playing or using contents; an encryption processing unit for executing encryption processing including authentication processing in the communication processing via the communication unit; and a control unit for executing output processing of contents-corresponding rights information via the communication unit with regard to the contents using device, with establishment of mutual authentication with the contents using device as a precondition thereof.

The encryption processing unit may have a configuration for executing mutual authentication and key-sharing processing with the contents using device, and for executing processing for setting a tampering verification value to rights information to be output to the contents using device, applying a key generated in the key-sharing processing.

The encryption processing unit may execute mutual authentication with a license purchasing device which receives rights information from a license server via a network, with the control unit executing input processing of contents-corresponding rights information via the communication unit, with establishment of the mutual authentication as a precondition thereof.

The encryption processing unit may have a configuration for executing mutual authentication and key-sharing processing with the license purchasing device, and for executing verification processing for a tampering verification value attached to contents-corresponding rights information input from the license purchasing device via the communication unit, applying a key generated in the key-sharing processing.

According to a third aspect of the present invention, a contents distribution server for distributing contents comprises: a communication unit for receiving a contents use request from a contents using device, and transmitting the contents; an encryption unit for executing encryption processing including legitimacy verification processing of contents-corresponding rights information received from the contents using device via the communication unit; and control unit for executing output processing of a contents file via the communication unit to the contents using device, with establishment of verification of the rights information as a precondition thereof.

The rights information may contain a valid information code serving as an identification code of validity management information of the rights information, with the control unit making reference to a validity management information table correlating validity information with the valid information code, and executes transmission processing of a contents file, with confirmation of the validity of the contents-corresponding rights information received from the contents using device as a precondition thereof.

The encryption processing unit may have a configuration for executing mutual authentication and key-sharing processing with the contents using device, and for executing processing for attaching a tampering verification value to the contents file being transmitted, applying a key generated in the key-sharing processing.

The control unit may execute processing for storing, in header information of a contents file to be transmitted to the contents using device, RHD check mode information setting whether or not to take connection with the license storage device at the time of playing contents as a precondition thereof.

The encryption processing unit may have a configuration for executing mutual authentication and key-sharing processing with the contents using device, and for executing encryption of a contents encryption processing key to be stored in a contents file, applying a key generated in the key-sharing processing.

According to a fourth aspect of the present invention, a license server for transmitting rights information serving as contents usage rights information via a network, comprises: a communication unit for executing communication processing with a requesting terminal requesting the rights information; an encryption processing unit for executing encryption processing including signature generating processing with regard to rights information to be transmitted via the communication unit; and a control unit for generating rights information storing an identifier of a license storage device serving as a storage device for the rights information, and executing output processing of the rights information, with establishment of the mutual authentication with the requesting terminal as a precondition thereof.

The encryption processing unit may have a configuration for executing mutual authentication and key-sharing processing with the requesting terminal, and for executing processing for setting a tampering verification value to rights information to be output to the requesting terminal, applying a key generated in the key-sharing processing.

The control unit may execute processing for generating and transmitting rights information storing identification information of a contents distribution server or index server which distributes contents corresponding to the rights information. Also, the control unit may generate and transmit rights information storing download type information containing permit/forbid information relating to cache processing permission of distribution contents.

According to a fifth aspect of the present invention, a contents distribution system comprises: a contents using device for playing or using contents; a license storage device storing rights information serving as contents usage rights information; and a contents distribution server; wherein the contents using device has a configuration for inputting contents-corresponding rights information from the license storage device, transmitting the input rights information to the contents distribution server, and receiving from the contents distribution server, and playing or using, contents regarding which the transmitted rights information have been set.

The contents distribution system may further comprise a license server which transmits rights information stored in the license storage device over a network, with the license storage device having a configuration for storing rights information which the license server transmits.

Mutual authentication processing may be executed between the license storage device and the contents using device, with output processing of rights information from the license storage device to the contents using device being executed with establishment of the mutual authentication as a precondition thereof. Also, mutual authentication processing may be executed between the contents using device and the contents distribution server, with output processing of rights information from the contents using device to the contents distribution server being executed with establishment of the mutual authentication as a precondition thereof.

Signature verification processing of rights information received from the contents using device may be executed at the contents distribution server, with transmission processing of a contents file including contents corresponding to the received rights information being executed with confirmation of the legitimacy of the received rights information by the signature verification processing as a precondition thereof.

According to a sixth aspect of the present invention, an information processing method for a contents using device which plays or uses contents, comprises: a rights information input step for inputting contents-corresponding rights information from a license storage device via a communication unit; a step for executing legitimacy verification processing of the rights information; a rights information transmission step for transmitting the input rights information to a contents distribution server with confirmation of the legitimacy of the rights information as a precondition thereof in the legitimacy verification processing; and a step for receiving contents set corresponding to the transmitted rights information, from the contents distribution server.

The information processing method may further comprise: a step for executing mutual authentication and key-sharing processing with the license storage device; and a step for executing verification processing of a tampering verification value attached to contents-corresponding rights information input from the license storage device, applying a key generated in the key-sharing processing.

The information processing method may further comprise: a step for executing mutual authentication and key-sharing processing with the contents distribution server; and a step for executing verification processing of a tampering verification value attached to a contents file from the contents distribution server, applying a key generated in the key-sharing processing.

According to a seventh aspect of the present invention, a computer program which executes, on a computer system, information processing for a contents using device which plays or uses contents, comprises: code for a rights information input step for inputting contents-corresponding rights information from a license storage device via a communication unit; code for a step for executing legitimacy verification processing of the rights information; code for a rights information transmission step for transmitting the input rights information to a contents distribution server with confirmation of the legitimacy of the rights information as a precondition thereof in the legitimacy verification processing; and code for a step for receiving contents set corresponding to the transmitted rights information, from the contents distribution server.

According to the present invention configured as described above, rights information (Right) indicating a license serving as usage rights corresponding to the contents is stored in a license storage device (RHD), and at the time of using the contents the rights information (Right) is output from the license storage device (RHD) to a contents using device (CPT) and further transmitted to a contents distribution server (CSS), with the legitimacy verification of the rights information (Right) being executed at the contents distribution server (CSS) and contents corresponding to the rights information (Right) being transmitted to the contents using device (CPT), so the same contents can be played on multiple contents using devices (CPT) one after another, with one license storage device (RHD).

Also, according to the configuration of the present invention, a signature of an issuer such as a license server (RSS) is attached to the rights information (Right), and signature verification is performed at the time of use, so unauthorized use of contents with rights information (Right) generated in an unauthorized manner or tampered with is eliminated; also, mutual authentication is executed at the time of communication between each entity, and MACs are attached to the data being exchanged, so data can be exchanged with the other party in a sure manner.

Also, according to the configuration of the present invention, the contents using device (CPT) periodically confirms the existence of the license storage device (RHD) by mutual authentication, and playing is stopped in the event that the existence is not confirmed, so settings can be made wherein the contents can be played only in a state that the media is set, in the same way as with a CD or the like.

Also, according to the configuration of the present invention, a validity management information database (VID) serving as a database wherein information regarding the valid period and valid number of times is linked with the contents ID, and a contents distribution server (CDS) refers to this database at the time of using the contents based on the rights information (Right) so as to confirm the validity of the rights information, so the server side can control expiration of rights, judgment of validity, and so forth.

Also, according to the configuration of the present invention, output control information is stored in the header information of the contents file, and the contents using device (CPT) acts in compliance with this, so the copyright holder side can set copy controlling in a flexible manner by setting the header information of the contents file.

Further, according to the configuration of the present invention, specs information and communication path information are transmitted from the contents using device (CPT) to the contents distribution server (CDS), so transmission of the contents can be performed at a format and exchange speed optimal for the contents using device (CPT).

Also, according to the configuration of the present invention, contents distribution server (CDS) or index server (CIS) information is stored in the rights information (Right), so the destination of the contents can be easily decided at the contents using device (CPT).

Further, according to the configuration of the present invention, detailed contents processing such as cache permission information and the like can be set in the rights information (Right), so various usage restrictions according to the contents can be realized. For example, there are two types of contents; download contents and streaming distribution contents, but with download-type contents that are static, i.e., that need no updating of data, caching the contents in the storage region of the contents using device (CPT) does away with the need to download the contents each time the contents are to be played. Such control information can be stored in the rights information.

Further, according to the configuration of the present invention, rights information corresponding to multiple contents can be stored in a single license storage device (RHD), so there is no need to set a device for each contents. Also, an arrangement can be realized wherein empty license storage devices (RHD) are sold, and rights information is purchased through a purchasing terminal and stored in the license storage device (RHD), so as to be used as usage information for multiple contents or new contents, rather than as fixed contents as with a CD or the like. Also, identification information (IDrhd) of the license storage device (RHD) is written to and stored in the rights information at the license server, so even in the event that copying is made to another license storage device (RHD), unauthorized use can be easily detected, thereby preventing unauthorized use of the rights information (Right).

The computer program according to the present invention is a computer program which can be provided to a general-purpose computer system capable of executing various types of program code in a computer-readable format by storage media or communication media, e.g., storage media such as CDs, floppy disks, magneto-optical disks, and the like, and communication media such as networks or the like. Processing compliant to the program is realized on the computer system due to the program being provided in a computer-readable format.

Further objects, features, and advantages of the present invention will be come more fully apparent from detailed description of the present invention by way of the later-described embodiments of the present invention and the attached drawings. It should be understood that the term "system" as used in the present Specification refers to a logical group configuration of multiple devices, and is by no means limited to arrangements wherein all of the devices are housed within the same enclosure.

BRIEF DESCRIPTION OF THE DRAWINGS

FIG. 5 is a diagram describing information stored in a storage unit which is non-volatile memory provided to each entity;

FIG. 6 is a diagram describing information stored in a storage unit which is non-volatile memory provided to each entity;

FIG. 7 is a diagram illustrating the format of a public key certificate (CERT);

FIG. 9 is a diagram describing the format of rights information (Right) certifying contents usage rights, that is stored in the license storage device (RHD);

FIG. 17 is a diagram describing specs information;

FIG. 22 is a flowchart describing the details of writing rights information (Right) to a license storage device (RHD).

DESCRIPTION OF THE PREFERRED EMBODIMENTS

Figure 1:
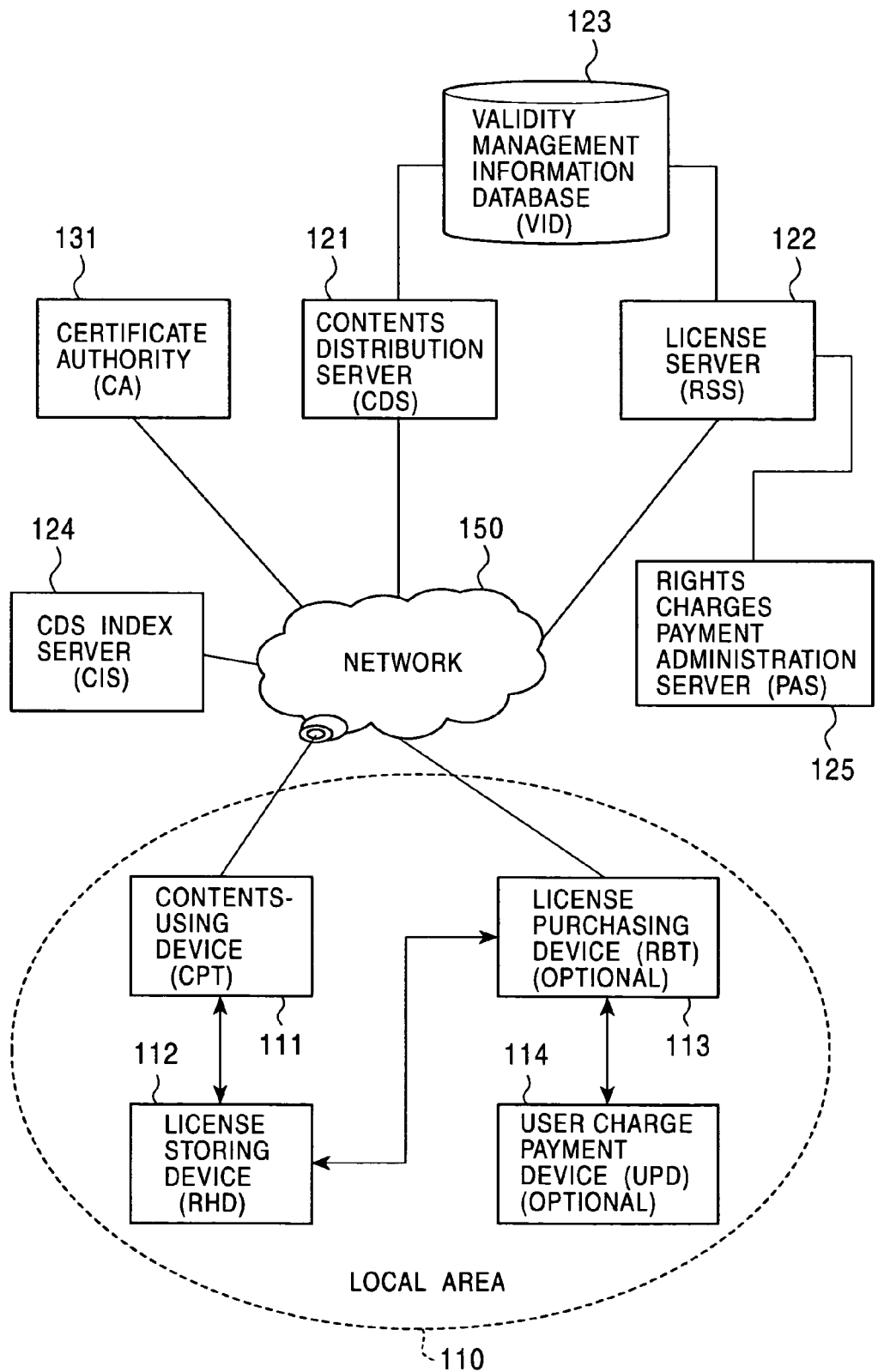
FIG. 1 is a diagram describing a system configuration to which the present invention is applicable.

The information processing device, contents distribution server, license server, and method and computer program, according to the present invention, will now be described with reference to the drawings.

The present invention realizes a configuration wherein a device storing usage rights information of contents and a contents using device which a user has in the home or the like are connected, the contents using device obtains the usage rights information of the contents and connects to a contents distribution server, so as to download and use or play the contents based on the usage rights. The present invention will be described in detail, in the order of:
1. System configuration;
2. Makeup of the devices;
3. Configuration of contents and rights information (Right)
4. Contents playing processing based on rights information (Right); and
5. Processing for purchasing and storing rights information (Right).

[1. System Configuration]

First, the overall system configuration for realizing the contents distribution and usage configuration according to the present invention will be described with reference to FIG. 1.

A user who is to play or use contents has a contents using device (which will also be referred to as a CPT (Contents Playing Terminal)) 111 which is capable of being connected to a network 150 in a local area 110. The contents are distributed from a contents distribution server 121 to the contents using device (CPT) via the network 150, and used.

In order to receive distribution of the contents and use the contents, the user needs usage rights for the contents (i.e., a license). The contents usage rights (license) is obtained from a license server (which will also be referred to as an RSS (Rights Selling Server)) 122, and is stored in a license storage device (which will also be referred to as a RHD (Rights Holding Device)) 112. There is also an arrangement wherein the usage rights can be obtained by purchasing a license storage device which has the contents usage rights (license) stored therein beforehand.

The license storage device (RHD) 112 has an interface for communicating with a contents using device (CPT) 111. Each of the devices have areas for holding key information necessary for authentication with an encryption processing devices for executing secure sessions. The license storage device (RHD) 112 is configured of a non-contact type IC card or memory device having an encryption processing unit, for example.

Upon the rights information (which will also be referred to as Rights hereafter) indicating the usage rights of contents serving as license information, that is stored in the license storage device (RHD) 112, being safely handed to the contents using device (CPT) 111 in a secure session, the contents using device (CPT) 111 verifies the legitimacy of the received rights information (Right) serving as the contents usage information.

Upon the legitimacy of the received rights information (Right) serving as the contents usage information being confirmed, the contents using device (CPT) 111 connects to the contents distribution server (CDS) 121. In order to obtain the contents to use, i.e., contents distribution server information of servers capable of distributing the contents corresponding to the received rights information (Right), the contents using device (CPT) 111 may negotiate with an index server (which will also be referred to as a CIS (CDS Index Server)) 124 if necessary. This is also used to avoid an access load being concentrated on a particular contents distribution server (CDS).

Upon being connected to the contents distribution server (CDS) 121, the contents using device (CPT) 111 transmits the received rights information (Right) serving as the contents usage information in a secure manner. The contents distribution server (CDS) 121 executes verification processing of the rights information (Right) serving as the contents usage information received from the contents using device (CPT) 111, and confirms whether or not there has been forgery. Further, the contents distribution server (CDS) 121 uses a validity management information database (which will also be referred to as a VID (Validity Information Database)) 123 which manages the validity period of rights information (Right), to confirm legitimacy of the received rights information (Right) serving as the contents usage information including whether within the valid period or not, and so forth.

Upon the legitimacy of the received rights information (Right) serving as the contents usage information received from the contents using device (CPT) 111 being confirmed, the contents distribution server (CDS) 121 executes distribution of the contents to the contents using device (CPT) 111.

The contents using device (CPT) 111 plays or uses the contents received from the contents distribution server (CDS) 121. There are two types of formats for playing the contents; one is a format wherein the contents are first downloaded all at once, stored in an attached recording medium, and then played, and the other is a format for streaming playing of the contents.

The rights information (Right) serving as the contents usage information includes data of a contents ID serving as a contents identifier to which a digital signature has been attached using a secret key of the provider of the rights information (Right). The entity which verifies the rights information (Right), such as the contents distribution server (CDS) 121 for example, performs signature verification processing using a public key corresponding to the secret key of the provider of the rights information (Right), so as to verify the legitimacy of the rights information (Right) serving as the contents usage information.

This means that a user having a license storage device (RHD) storing rights information (Right) is authenticated as being a user having usage rights to the contents, and accordingly can receive rights information (Right) serving as the contents usage information from the license storage device (RHD) to various types of contents using devices, such as personal computers, play-only devices, game terminals, communication terminals, and so forth, and transfer the received rights information (Right) to a contents distribution server (CDS), so as to receive and use or play the contents.

The following are examples of methods for a user to obtain a license storage device (RHD).

A first method is for a user to purchase or rent a license storage device (RHD) with rights information (Right) serving as the contents usage information saved therein at a shop. This is the same as how CDs, DVDs, etc., are already being distributed.

A second method is for a user to purchase a license storage device (RHD) with nothing written therein, then purchasing contents online based on payment of certain usage charges, and writing rights information (Right) serving as the contents usage information, dynamically generated at the time of the purchase, into the license storage device (RHD). A dedicated device is used for writing the rights information (Right).

A license purchasing device (which will also be referred to as an RBT (Rights Buying Terminal)) 113 and a user charges payment device (which will also be referred to as an UPD (User Payment Device)) 114 shown in FIG. 1 are used for the online purchasing processing of the rights information (Right) serving as the contents usage information.

The license purchasing device (RBT) 113 connects to the licenser server (RSS) 122 and transmits settlement information from a user charges payment device (UPD) capable of storing or inputting user settlement information to the license server (RSS) 122 via the license purchasing device (RBT). The license server (RSS) 122 transmits the settlement information to a rights charges payment administration server (which will also be referred to as a PAS (Payment Administration Server)) 125 which executes the settlement processing. The rights charges payment administration server (PAS) 125 manages credit information for each user charges payment device (UPD) 114. The rights charges payment administration server (PAS) 125 judges the legitimacy of the settlement information and permission/non-permission of the settlement processing, and in the event that the settlement processing can be made, executes the settlement processing and notifies the license server (RSS) 122 of the results thereof. The license server (RSS) 122 transmits a license to the license purchasing device (RBT) 113 based on the notification, and the license is written to the license storage device (RHD) from the license purchasing device (RBT) 113.

A third method regards a case wherein the user himself/ herself is a contents provider, to provide original contents or the like, for example. In this case, the user compiles rights information (Right) serving as the contents usage information following a predetermined format, creates an appropriate signature key (PRIrss), attaches a signature, and writes this to the license storage device (RHD). In this case, the user starts up a contents distribution server (CDS) corresponding to the rights information (Right) serving as the contents usage information.

The license storage device (RHD) 112 and contents using device (CPT) 111 shown in FIG. 1 have public key encryption modules with anti-tampering configurations, and the license storage device (RHD) 112, contents using device (CPT) 111, and contents distribution server (CDS) 121 each receive public key certificates from a certificate authority (CA) 131.

The public key certificate has a field describing, as attributes information, information indicating the type of device, i.e., whether a license storage device (RHD), contents using device (CPT), or contents distribution server (CDS).

Only rights information (Right) indicating the usage rights of the contents is stored in the license storage device (RHD), and the legitimacy of the rights information (Right) is confirmed by the contents distribution server (CDS).

In order to use the contents with the contents using device (CPT), the license storage device (RHD) is connected with the contents using device (CPT) and perform mutual authentication (performing attributes checking of the other party and key-sharing), and the rights information (Right) is transmitted from the license storage device (RHD) to the contents using device (CPT).

Next, the contents using device (CPT) and contents distribution server (CDS) perform mutual authentication (performing attributes checking of the other party and key-sharing), and the rights information (Right) is transmitted from the contents using device (CPT) to the contents distribution server (CDS). The contents distribution server (CDS) checks the legitimacy of the rights information, and with confirmation of the legitimacy as a precondition, transmits the contents header and encrypted contents proper to the contents using device (CPT). The contents using device (CPT) reads the header information, applies the key information in the header information to execute contents decryption processing, and plays or uses the contents.

Note that the legitimacy checking processing of the rights information at the contents distribution server (CDS) is executed as verification processing of the electronic signature provided to the rights information. The rights information is data to which a signature of an issuer or vendor of the rights information is attached with a secret key, and the contents distribution server (CDS) performs signature verification processing applying a public key corresponding to the secret key to verify the legitimacy of the rights information.

[2. Makeup of the Devices]

Next, a hardware configuration example of each of the devices (entities) configuring the system shown in FIG. 1, will be described.

(1) Makeup of Contents Distribution Server (CDS), Index Server (CIS), License Server (RSS), and Rights Charges Payment Administration Server (PAS)

Figure 2:
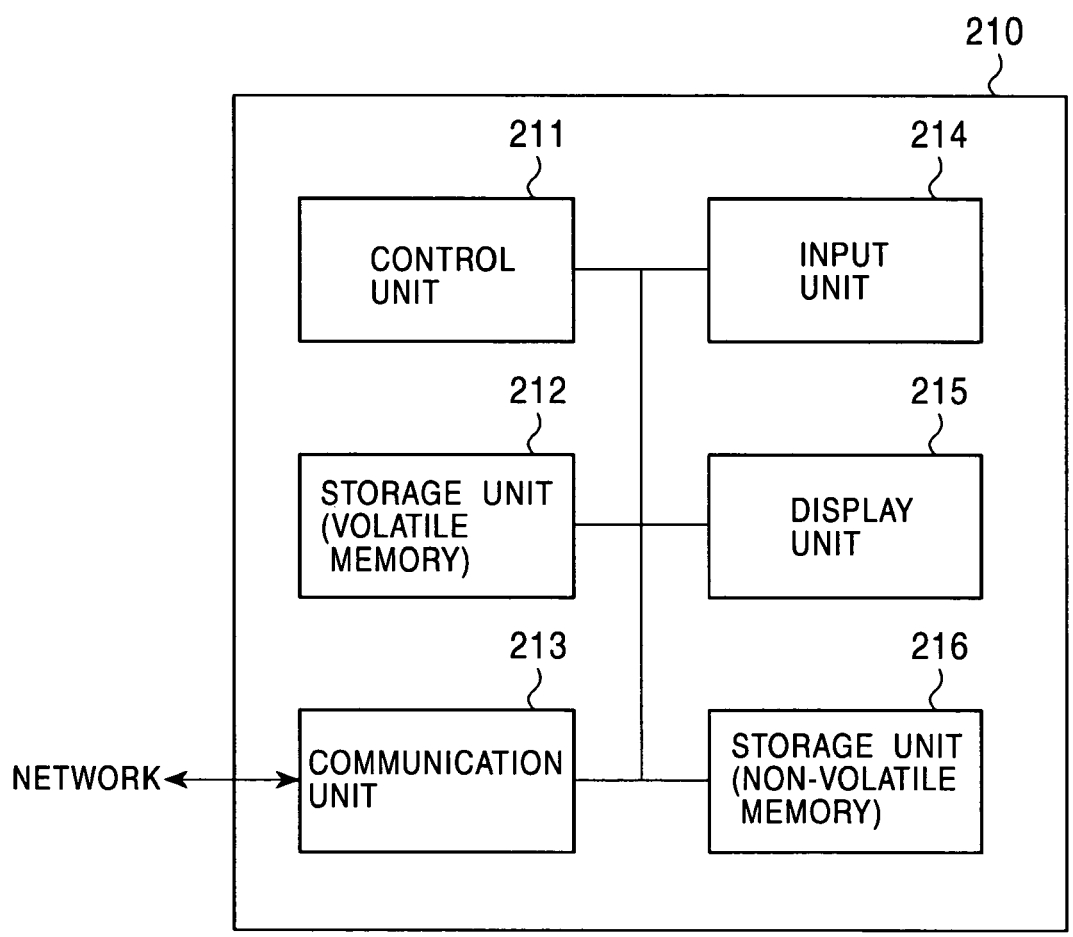
FIG. 2 is a diagram illustrating a configuration example of a contents distribution server (CDS), index server (CIS), license server (RSS), and a usage rights charges payment administration server (PAS)

First, a configuration example of the contents distribution server (CDS), index server (CIS), license server (RSS), and rights charges payment administration server (PAS), will be described with reference to FIG. 2. As shown in FIG. 2, these servers 210 comprise a control unit 211 configured of a CPU (Central Processing Unit) or the like, a volatile memory unit 212 configured of RAM, a communication unit 213 serving as a data transmission/reception unit via a network, an input unit 214 having input means such as a keyboard, mouse, or the like, a display unit 215 having a monitor such as a CRT or LCD or the like and a speaker or the like, and a non-volatile storage unit 216 configured of ROM, a hard disk, flash memory, or the like.

Processing programs corresponding to each of the servers are stored in the storage unit, the programs are executed by the control unit, and thus processing corresponding to each of the servers is carried out. Specific processing for each of the servers will be described at a later point.

(2) Makeup of License Purchasing Device (RBT) and Contents Using Device (CPT)

Figure 3:
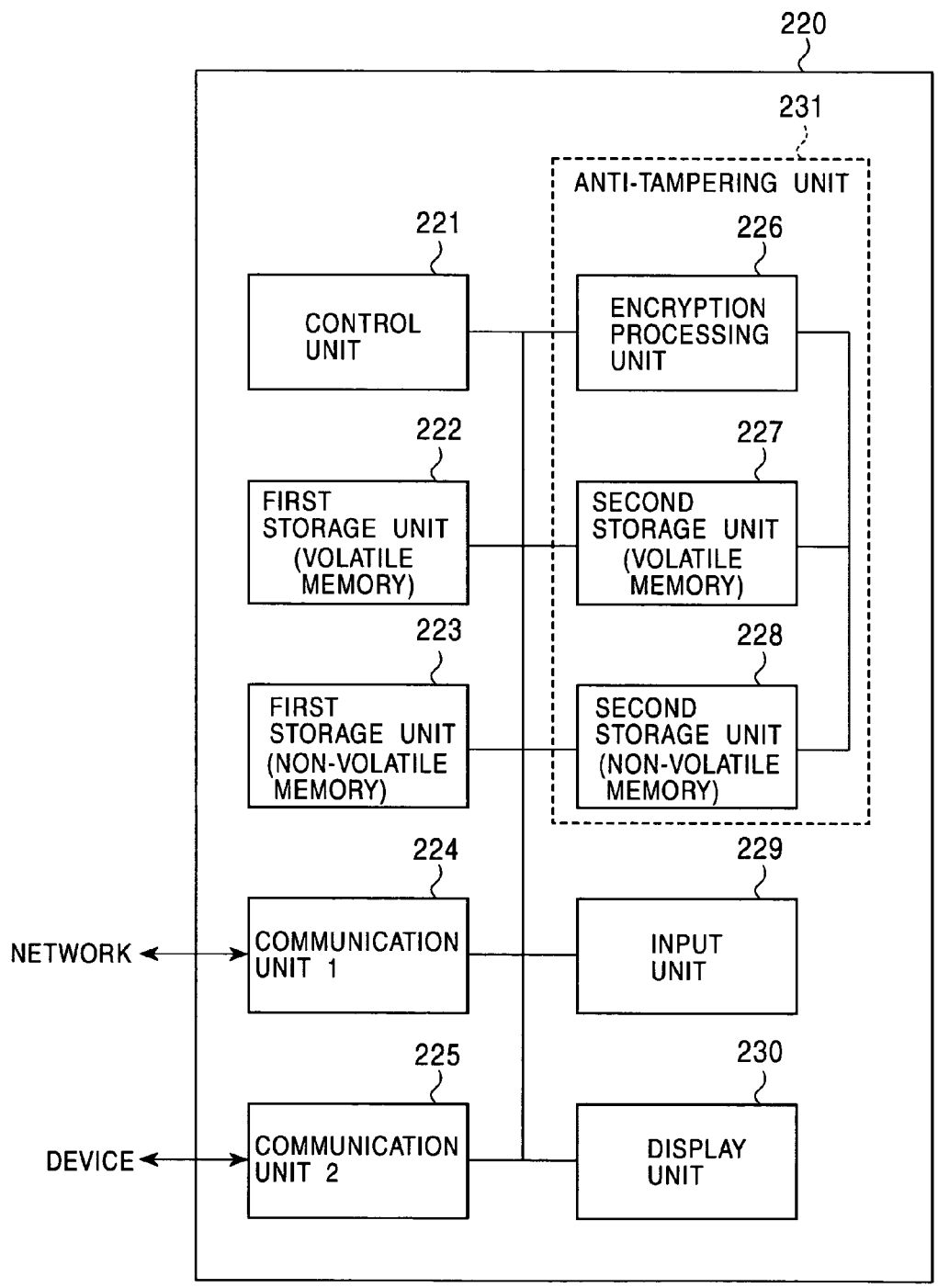
FIG. 3 is a diagram illustrating a configuration of a licenser purchasing device (RBT) and a contents using device (CPT)

Next, a configuration example of the license purchasing device (RBT) and contents using device (CPT) will be described with reference to FIG. 3. As shown in FIG. 3, these devices 220 comprise a control unit 221 configured of a CPU (Central Processing Unit) or the like, a first volatile storage unit 222 configured of RAM, a first non-volatile storage unit 223 configured of ROM, a hard disk, flash memory, or the like, a first communication unit 224 serving as a data transmission/reception unit via a network, a second communication unit 225 serving as a communication interface for executing near-distance communication with other devices over a wireless LAN or by Bluetooth or the like, an encryption processing unit 226 for executing various types of encryption processing such as encryption processing of communication data, authentication processing, signature generating and verifying processing, and so forth, a second volatile storage unit 227 serving as a storage unit for processing programs, key information, parameters, and so forth, for the encryption processing unit 226, a second non-volatile storage unit 228, an input unit 229 having input means such as a keyboard, mouse, or the like, a display unit 230 having a monitor such as a CRT or LCD or the like and a speaker or the like, and so forth.

Note that the encryption processing unit 226, second volatile storage unit 227, and second non-volatile storage unit 228 are stored in an anti-tampering unit 231 from which external reading of data is prevented.

The processing programs corresponding to each of the devices are stored in the storage unit and executed at the control unit, whereby processing corresponding to each device is carried out. Specific processing for each device will be described later.

(3) Makeup of License Storage Device (RHD) And User Charges Payment Device (UPD)

Figure 4:
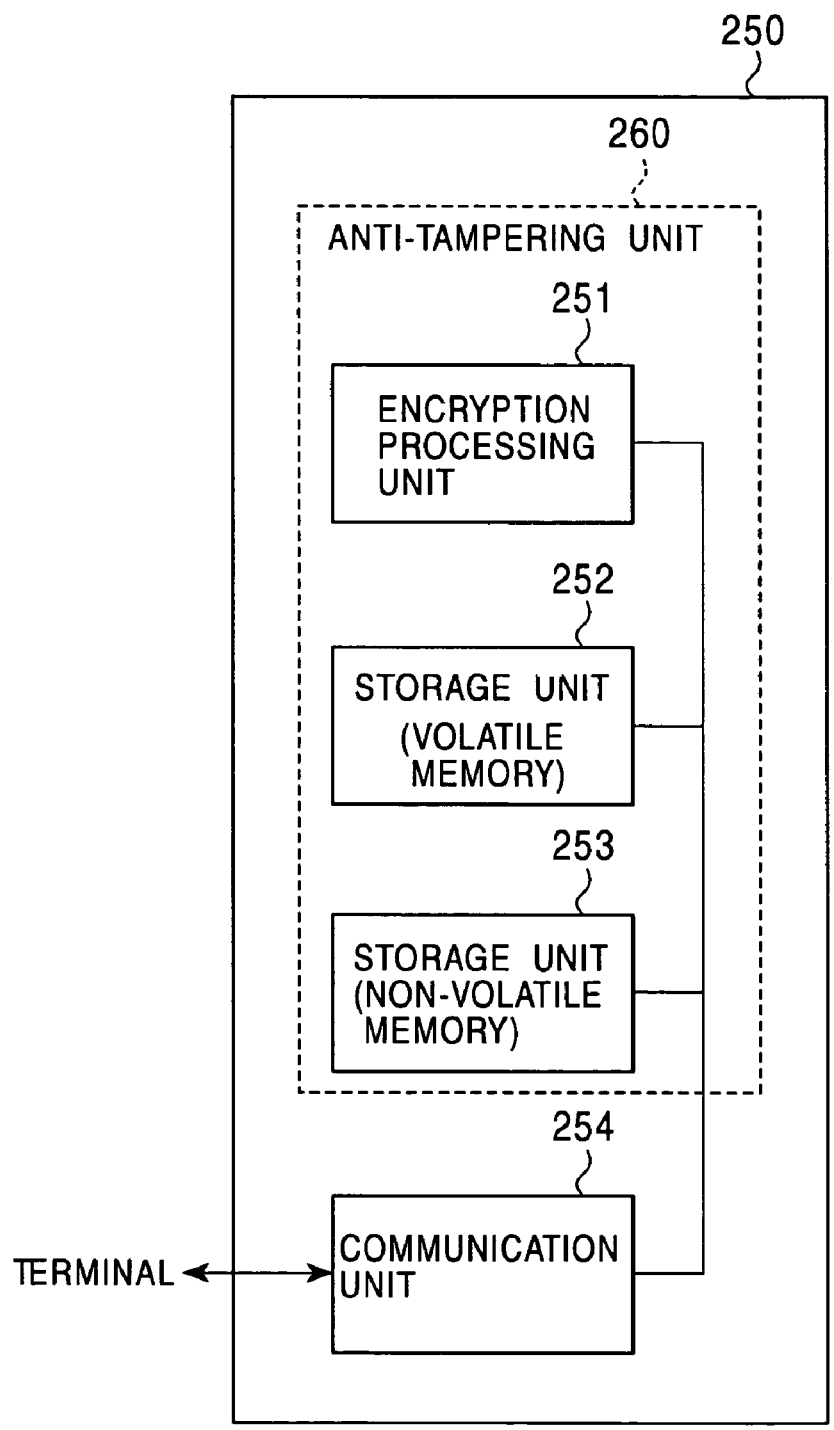
FIG. 4 is a diagram illustrating a configuration example of a license storage device (RHD) and user usage charges payment execution device (UPD)

A configuration example of the license storage device (RHD) and user charges payment device (UPD) will be described with reference to FIG. 4. As shown in FIG. 4, these devices 250 comprise an encryption processing unit 251 for executing various types of encryption processing such as encryption processing of communication data, authentication processing, signature generating and verifying processing, and so forth, a volatile storage unit 252 serving as a storage unit for processing programs, key information, parameters, and so forth, for the encryption processing unit 251, a non-volatile storage unit 253, and a communication unit 254 serving as a data transmission/reception unit with a terminal.

Note that the encryption processing unit 251, volatile storage unit 252, and non-volatile storage unit 253 are stored in an anti-tampering unit 260 from which external reading of data is prevented.

The encryption processing programs corresponding to each of the devices are stored in the storage unit and executed at the encryption processing unit 251, whereby processing corresponding to each device is carried out. Specific processing for each device will be described later.

(4) Stored Data within Storage Unit

Next, the information stored in the non-volatile memory storage units of each entity will be described with reference to FIGS. 5A through 6E. FIG. 5A shows a Data Table (a) for the contents distribution server (CDS), FIG. 5B a Data Table (b) for the index server (CIS), FIG. 5C a Data Table (c) for the license server (RSS), and FIG. 5D a Data Table (d) for the rights charges payment administration server (PAS).

To illustrate, "IDxxx" is an identifier (ID) of an entity xxx, "PRIxxx" is a secret key (PRI) of the entity xxx, "CERTxxx" is a public key certificate (CERT) of the entity xxx, "PUBxxx" is a public key (PUB) of the entity xxx, and DB denotes a database.

As shown in FIGS. 5A through 5D, each of the contents distribution server (CDS) shown in Data Table (a), the index server (CIS) shown in Data Table (b), the license server (RSS) shown in Data Table (c), and the rights charges payment administration server (PAS) shown in Data Table (d), hold their own identifier (ID), secret key (PRI), public key certificate (CERT), and store a public key of the certificate authority (CA).

Data Table (a): The contents distribution server (CDS) has within a database (DB) data correlating multiple contents (Cont1 through Contn), with public keys (PUBrss1 through PUBrssn) of the contents identifier (IDcont1 through Idcontn) and the license server (RSS) for each of the contents (Cont1 through Contn). The public keys (PUBrss1 through PUBrssn) are keys applied for legitimacy verification (signature verification) of rights information (Right) at the time of using the contents, and are public keys corresponding to the secret key of the license server (RSS).

Data Table (b): The index server (CIS) has within a database (DB) data correlating multiple contents identifiers (IDcont1 through IDcontn) with identifiers (IDcds1 through Idcdsn) of the contents distribution server (CDS).

Data Table (c): The license server (RSS) has within a database (DB) rights information (Right).

Data Table (d): The rights charges payment administration server (PAS) has within a database (DB) user charges payment device (UPD) identifiers with credit information correlated to each.

FIGS. 6A through 6E show the stored data in non-volatile memory of the contents using device (CPT), license storage device (RHD), license purchasing device (RBT), and user charges payment device (UPD).

As with FIGS. 5A through 5D, "IDxxx" is an identifier (ID) of an entity xxx, "PRIxxx" is a secret key (PRI) of the entity xxx, "CERTxxx" is a public key certificate (CERT) of the entity xxx, "PUBxxx" is a public key (PUB) of the entity xxx, and DB denotes a database.

As shown in FIGS. 6A through 6E, each storage unit of the contents using device (CPT) shown in Data Table (e), license storage device (RHD) shown in Data Table (g), memory within the anti-tampering unit of the license purchasing device (RBT) shown in Data Table (h), and user charges payment device (UPD) shown in Data Table (i), hold their own identifier (ID), secret key (PRI), public key certificate (CERT), and store a public key of the certificate authority (CA).

Data Table (e): Memory within the anti-tampering unit of the contents using device (CPT), i.e., the second storage unit (non-volatile memory) 228 connected to the encryption processing unit shown in FIG. 3 further stores an index server (CIS) identifier (IDcis) serving as information of a default index server (CIS), and storage keys (Ksto1 and Ksto2) serving as encryption processing keys for saving contents locally (i.e., within its own storage device).

Data Table (f): Memory outside of the anti-tampering unit of the contents using device (CPT) stores contents (Cont1 through Contn) along with MACs serving as tampering verification data.

Data Table (g): The storage unit of the license storage device (RHD) stores the rights information (Right1 through Rightn) held. The rights information (Right1 through Rightn) is rights information set corresponding to the contents, and is output to the contents using device (CPT) at the time of using the contents at the contents using device (CPT).

FIG. 7 shows the format of a public key certificate (CERT). The public key certificate stores a public key certificate identifier (IDcert), public key (PUBxxx), attributes information (Attribute), and a certificate authority signature (SIGca). Specifically, a public key certificate following the X.509 format, for example, is applicable.

[3. Configuration of Contents and Rights Information (Right)]

Next, the format of a contents file distributed from a contents distribution server (CDS) to a contents using device (CPT), and the format of the rights information (Right) certifying the rights to use the contents stored in the license storage device (RHD), will be described.

Figure 8:
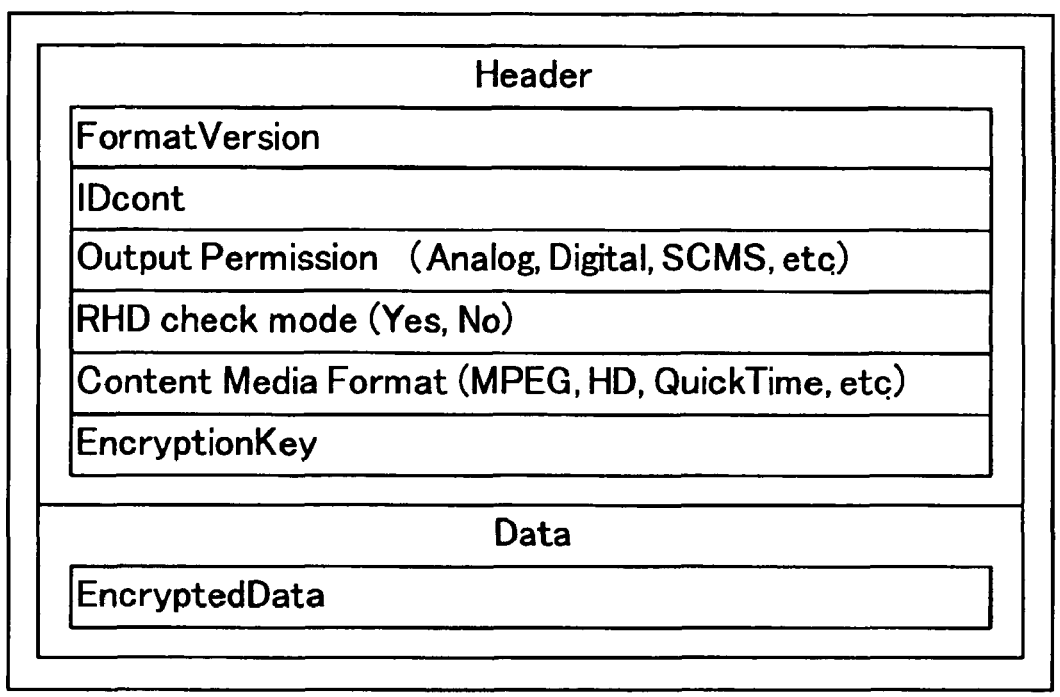
FIG. 8 is a diagram illustrating the format of a contents file distributed from a contents distribution server (CDS) to a contents using device (CPT)

FIG. 8 illustrates the format of a contents file distributed from a contents distribution server (CDS) to a contents using device (CPT). The contents file is made up of a header (represented by "Header" in the Figure) and a contents data portion (represented by "Data"), with the contents in the contents data portion (Data) being encrypted by an encryption key (represented by "Encryption key") stored in the header (Header).

The header portion stores the format version (Format Version), contents identifier (IDcont), and output permission information (Output Permission) for outputting the contents to an external device, and this region stores data output restriction information such as analog, digital, SCMS (Serial Copy Management System), and so forth.

Further stored is RHD check mode information (RHD check mode) regarding whether the license storage device (RHD) being connected to the contents using device (CPT) at the time of the contents using device (CPT) playing or using the contents is a precondition, and in the event that the RHD check mode is set to Yes, checking processing is performed regarding whether the license storage device (RHD) is connected to the contents using device (CPT) at the time of the contents using device (CPT) playing or using the contents, and the contents can be played or used with confirmation of the license storage device (RHD) being connected to the contents using device (CPT) as a precondition. Details of these processes will be described later.

Further stored is format information such as the media format information of the stored contents (Content Media Format); MPEG, HD, QuickTime, and so forth, for example. Also stored is the encryption key of the stored contents (Encryption Key).

Next, the format of the rights information (Right) certifying the rights to use the contents stored in the license storage device (RHD), will be described with reference to FIG. 9. The rights information (Right) is rights information which is set corresponding to the contents, and at the time of the contents using device (CPT) using the contents, the rights information (Right) is output to the contents using device (CPT) and further transmitted to the contents distribution server (CDS), whereby contents described with reference to FIG. 8 are distributed from the contents distribution server (CDS) to the contents using device (CPT) under the precondition that the legitimacy thereof has been confirmed.

The rights information (Right) includes the format version (Format Version), a rights information identifier (IDright), the identifier of the license storage device (RHD) assigning the rights information (Right) (IDrhd), the identifier of the contents distribution server (CDS) holding the contents corresponding to the rights information (Right) (IDcds), the identifier of the index server (CIS) (IDcis), and download-type information of the contents (Download Type) indicating whether or not caching processing is permissible and whether or not the data is streaming data, and a signature (SIGrss) is attached to this information with a secret key of the license server (RSS).

Note that the identifier of the contents distribution server (CDS) (IDcds) and the identifier of the index server (CIS) (IDcis) are optional, and are not indispensable.

Figures 10A, 10B:
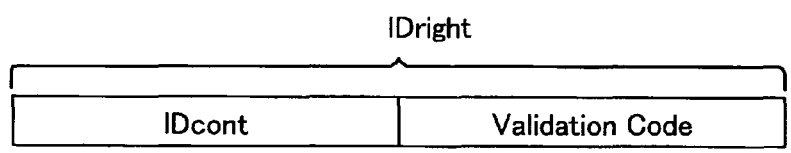
FIGS. 10A and 10B are diagrams describing the details of a rights information identifier (IDright), and the configuration of a validity management information database.

The detailed configuration of the rights information identifier (IDright) will be described with reference to FIGS. 10A and 10B. As shown in FIG. 10A, the rights information identifier (IDright) is information containing a contents identifier (IDcont) corresponding to the rights information (Right) and a validity information code (Validation Code).

The validity information code (Validation Code) is a code set in the validity management information database (VID (Validity Information Database)) shown in FIG. 10B. The validity management information database (VID) stores a contents identifier (IDcont), validity information code (Validation Code), starting date-and-time (Start) of the period over which the contents can be used, the ending date-and-time thereof (End), and the number of times remaining that the contents can be used (Remaining Count). Entries in the database (VID) are generated by the license server (RSS) executing the issuing processing for the rights information (Right), and subsequently, the database (VID) is referred to by the contents distribution server (CDS) based on the usage of the rights information (Right), and the data is updated again. For example, the database (VID) is referred to in the event that new rights information (Right) is transmitted to the contents distribution server (CDS) and a contents usage request is made.

Also, the information of starting date-and-time (Start) of the period over which the contents can be used, the ending date-and-time thereof (End), and the number of times remaining that the contents can be used (Remaining Count), is referred to at the time of using the contents, and updated as necessary, such as the Remaining Count data being decremented by 1.

[4. Contents Playing Processing Based on Rights Information (Right)]

Next, the procedures of contents playing processing based on rights information (Right) will be described in detail with reference to the flowcharts from FIG. 11 on.

Figure 11:
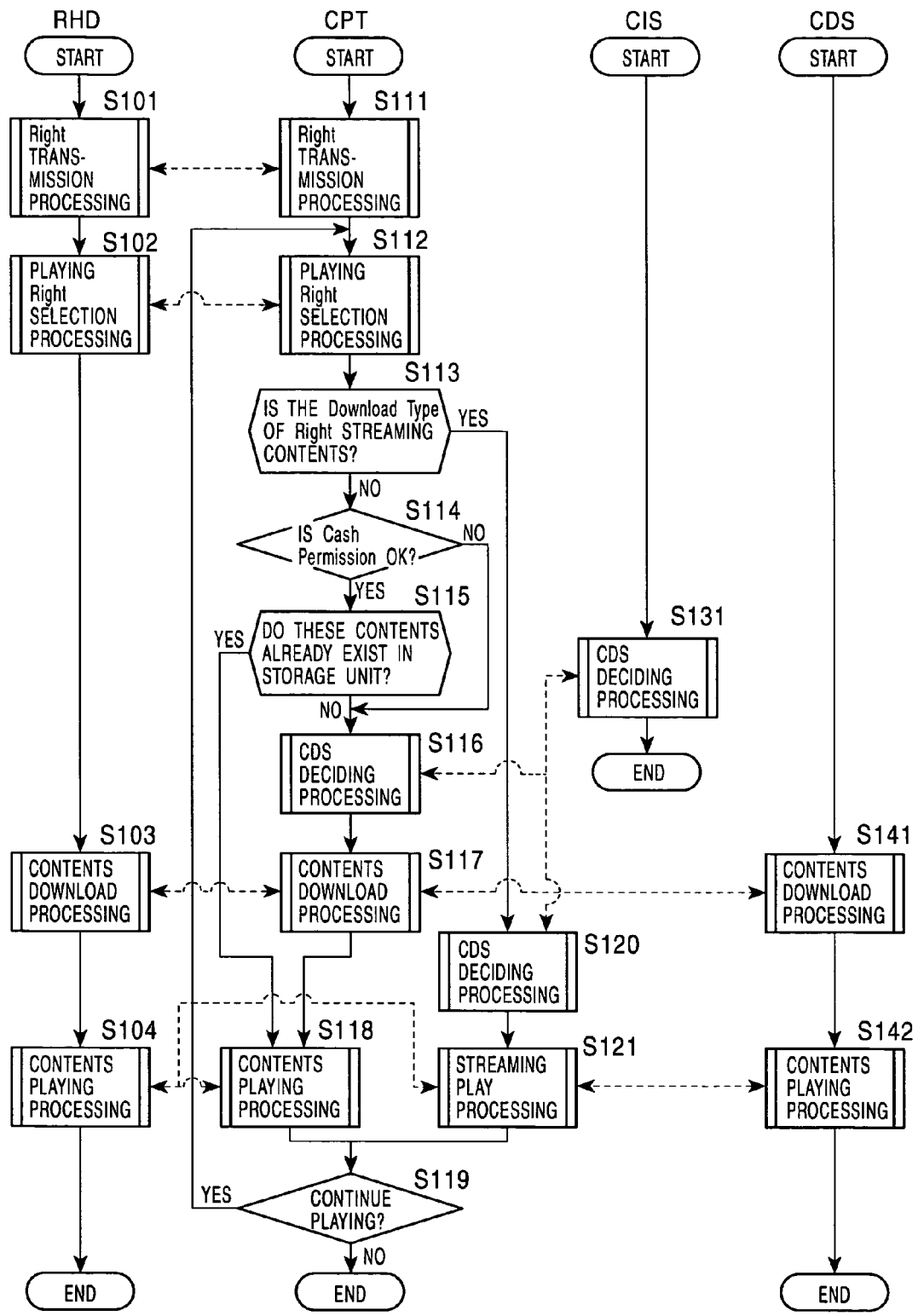
FIG. 11 is a flowchart describing the procedures for contents playing processing based on the rights information (Right)

FIG. 11 is a flowchart describing the series of processes of a contents using device (CPT) receiving rights information (Right) as a contents usage license stored in a license storage device (RHD), transmitting the rights information (Right) to a contents distribution server (CDS), and receiving the contents corresponding to the rights information (Right) from the contents distribution server (CDS), and playing the contents. The processing for making an inquiry to an index server (CIS) in the processing for deciding the contents distribution server (CDS) is also indicated here.

Also note that the processes in each of the processing flows described from here on are executed following programs stored in the storage units of each of the entities shown in FIGS. 2 through 4, primarily by the control units thereof. However, various types of encryption processing such as authentication processing, generating MACs, MAC verification, generating signatures, signature verification, and encryption and decryption of communication data, are executed at the encryption processing units of each entity.

The steps in the processing flows in FIG. 11 will be described. First, processing for transmitting rights information (Right) serving as a contents usage license from a license storage device (RHD) to a contents using device (CPT) which plays and uses contents is executed (steps S101 and S111).

Figure 12:
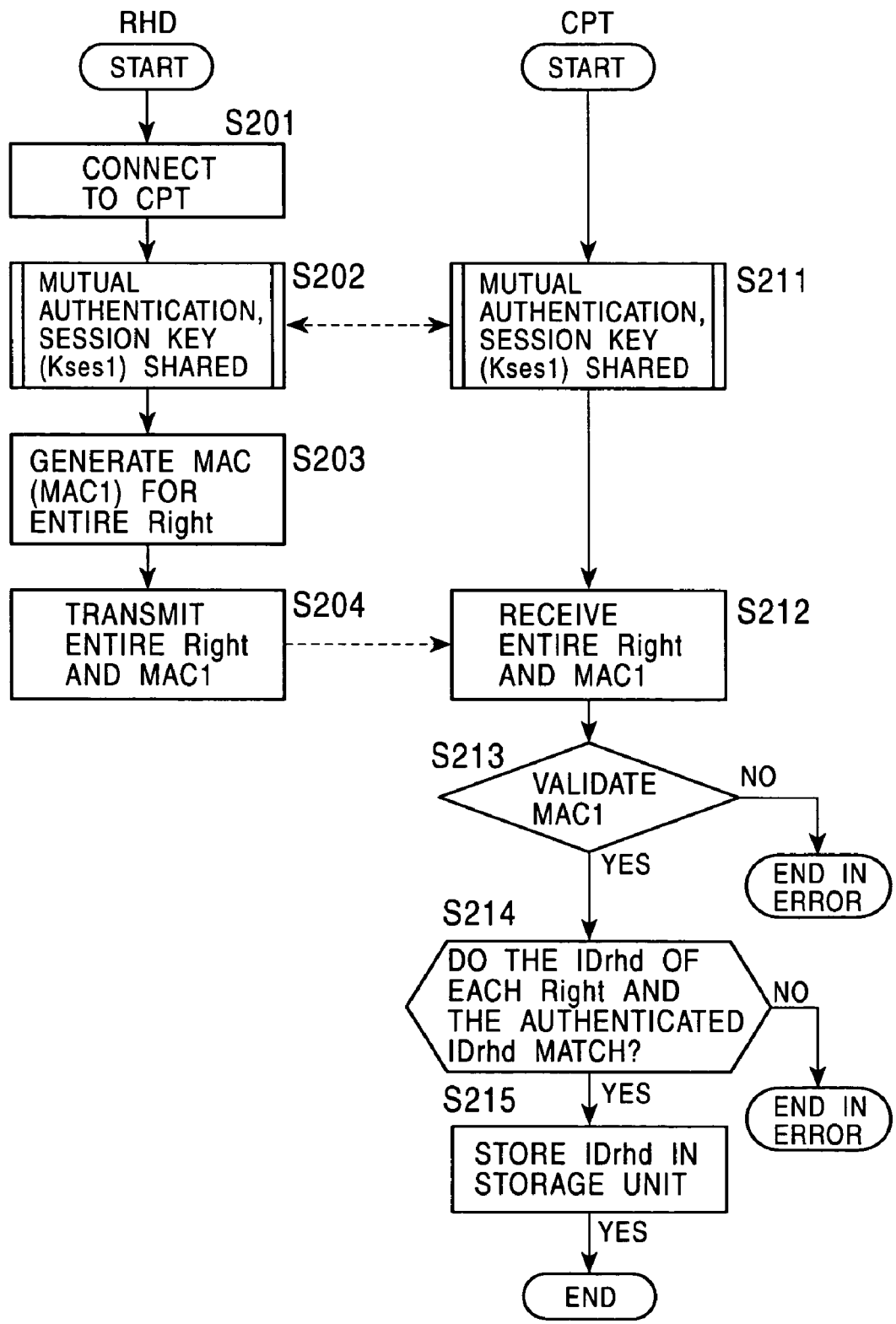
FIG. 12 is a flowchart describing the procedures for transmission processing of the rights information (Right)

The details of the transmission processing for the rights information (Right) will be described with reference to FIG. 12. First, in step S201, the license storage device (RHD) connects to the contents using device (CPT) and secures a communication path. This communication path may be either a cable or wireless communication path. Next, mutual authentication is executed between the license storage device (RHD) and the contents using device (CPT), and a session key (Kses1) is shared. The mutual authentication follows a public key encryption method, such as ISO/IEC 9798-3. In the event that the mutual authentication fails, the following processing is aborted.

Upon mutual authentication being established between the license storage device (RHD) and the contents using device (CPT), and the session key (Kses1) being shared, in step S203 the license storage device (RHD) executes generating of a MAC (MAC1) serving as a tampering verification value for the rights information (Right) stored in its own storage unit, applying the session key (Kses1).

A MAC (Message Authentication Code) is generated as data for verifying tampering of the data. Though there are various formats for generating MACs and for the verification processing, an example of generating a MAC value using a DES encryption processing configuration is shown in FIG. 13.

The example of generating a MAC value applying the DES encryption processing configuration shown in FIG. 13 will be described. A message which is the subject thereof is divided into increments of 8 bytes (hereafter, the divided message will be denoted by M1, M2, and so on through MN), and first, the exclusive-OR of an initial value (hereafter, IV) and M1 is taken as I1. Next, I1 is placed in the DES encryption unit and encrypted with a key (hereafter K1), and the output thereof is taken as E1. Subsequently, the exclusive-OR of E1 and M2 is taken, the output I2 thereof is placed in the DES encryption unit and encrypted with the key K1 to yield output E2. This process is repeated until the entire message is encrypted. The output EN obtained at the end is the message authentication code (MAC).

Figure 13:
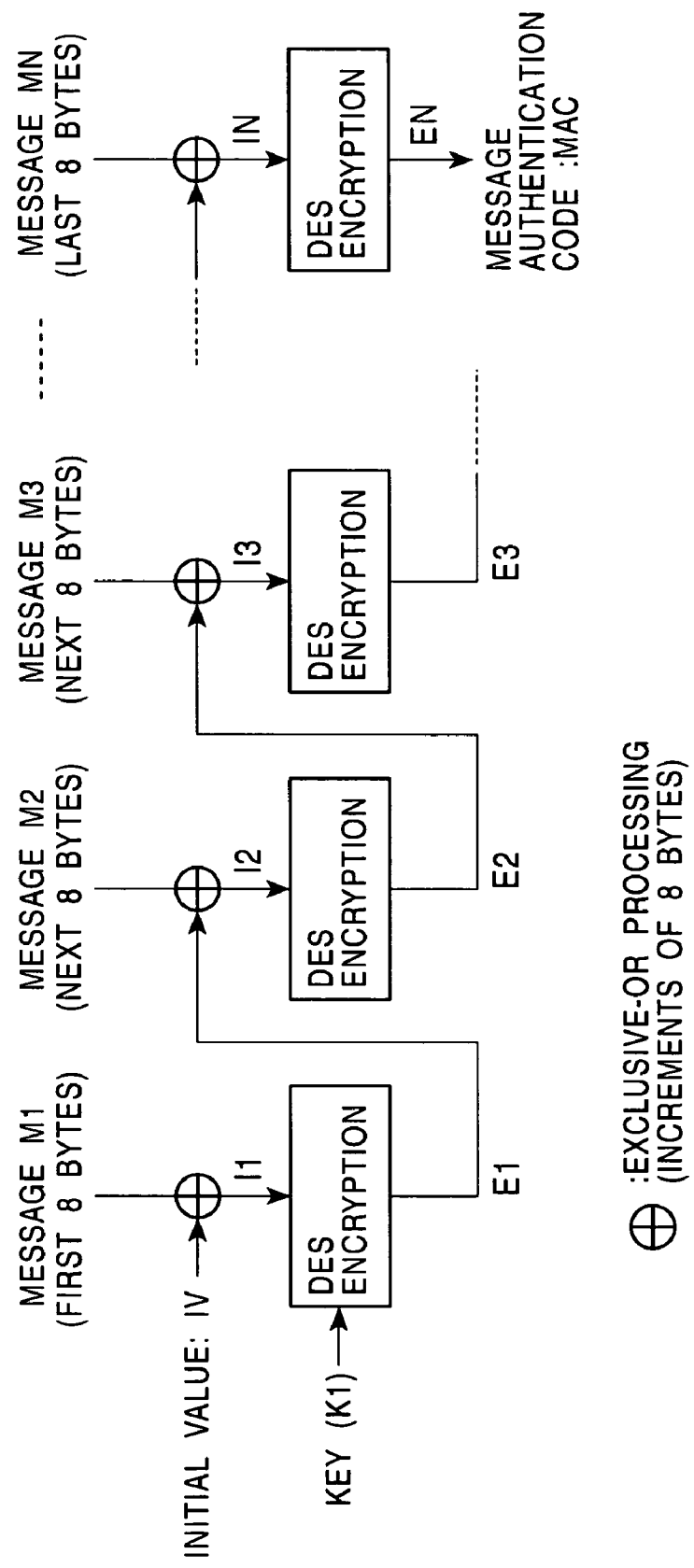
FIG. 13 is a diagram describing an example of generating a MAC value using a DES encryption processing configuration.

The license storage device (RHD) applies the session key (Kses1) to the entire rights information (Right) stored in its own storage unit, and generates a MAC (MAC1) as a verification code by the DES encryption processing shown in FIG. 13, for example.

In step S204, the entire rights information (Right) and generated MAC (MAC1) are transmitted to the contents using device (CPT). In step S212, the rights information (Right) and MAC (MAC1) are received by the contents using device (CPT), and in step S213, MAC verification processing is performed, i.e., the MAC calculated based on the received rights information (Right) and the received MAC (MAC1) are checked. If the two MACs match, judgment is made that the received rights information (Right) has not been tampered with, and the flow proceeds to step S214. In the event that the two MACs do not match, judgment is made that the received rights information (Right) has been tampered with, and the flow ends in error.

In step S214, judgment is made regarding whether or not the identifier (IDrhd) (see FIG. 9) of the license storage device (RHD) stored in the received rights information (Right) matches with the identifier (IDrhd) of the license storage device (RHD) with which authentication was made in step S211 earlier. In the event that these do not match, judgement is made that the received rights information (Right) is not the rights information (Right) which the license storage device (RHD) sending the rights information (Right) is permitted to have, and the flow ends in error.

In the event that these match, judgement is made that the received rights information (Right) is rights information (Right) which the license storage device (RHD) sending the rights information (Right) is permitted to have, so the rights information (Right) is legitimate, and accordingly, the identifier (IDrhd) of the license storage device (RHD) is stored in the storage unit in step S215.

Now, returning to FIG. 11, upon the transmission processing of the rights information (Right) in steps S101 and S111 being completed, selection processing of the rights information (Right) corresponding to the contents to be used or played is executed between the contents using device (CPT) and the license storage device (RHD).

Figure 14:
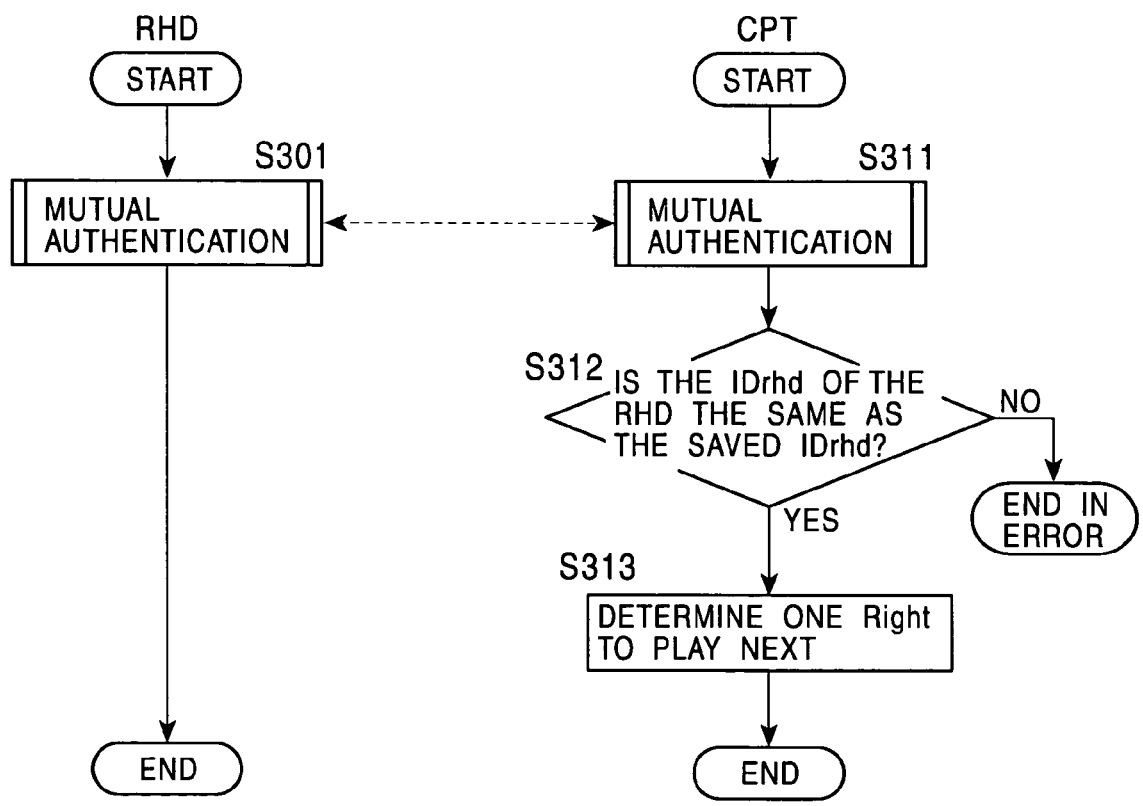
FIG. 14 is a flowchart describing selection processing of rights information (Right)

The selection processing of the rights information (Right) will be described with reference to the flowchart in FIG. 14. In steps S301 and S311, mutual authentication is executed between the license storage device (RHD) and the contents using device (CPT). In the event that the selection processing of the playing rights information (Right) shown in FIG. 14 is performed as a continuation from the rights information (Right) transmission processing in step S101 and S111 shown in FIG. 11, mutual authentication has already been executed in the rights information (Right) transmission processing in step S101 and S111, so the authentication processing here may be omitted. In the event that the authentication fails, the processing ends in error.

In the event that the authentication is established or has already been established, in step S312 the contents using device (CPT) judges whether or not the identifier (IDrhd) of the license storage device (RHD) matches the IDrhd stored in the storage unit earlier (S215 in FIG. 12), and in the event that these do not match, judgement is made that a device other than the license storage device (RHD) which sent the rights information (Right) earlier is connected, and the processing ends in error.

In the event that these match, judgement is made that the same license storage device (RHD) as the license storage device (RHD) which sent the rights information (Right) earlier is connected, and in step S313, the rights information (Right) corresponding to the contents to be used or played is selected from the entire data of the rights information received earlier.

Returning to FIG. 11, in step S113, the contents using device (CPT) verifies the download type of the selected rights information (Right) (see FIG. 9), and judges whether or not the download type is set as streaming contents. In the event that the download type is set as streaming contents, the contents distribution server (CDS) deciding processing in step S120 is executed.

In the event that the download type is not streaming contents, the flow proceeds to step S114 and further verifies the download type, and judgement is made regarding whether or not caching is permitted. In the event that caching is permitted in step S115, judgment is made regarding whether or not the same contents as the contents to be used are already stored in the storage unit, and in the event that the same contents are not stored therein, the flow proceeds to the contents playing processing in step S118, but in the event that the same contents are already stored therein, the contents distribution server (CDS) deciding processing of step S116 is executed. In the event that caching is not permitted (No in S114), the contents distribution server (CDS) deciding processing of step S116 is still executed.

Figure 15:
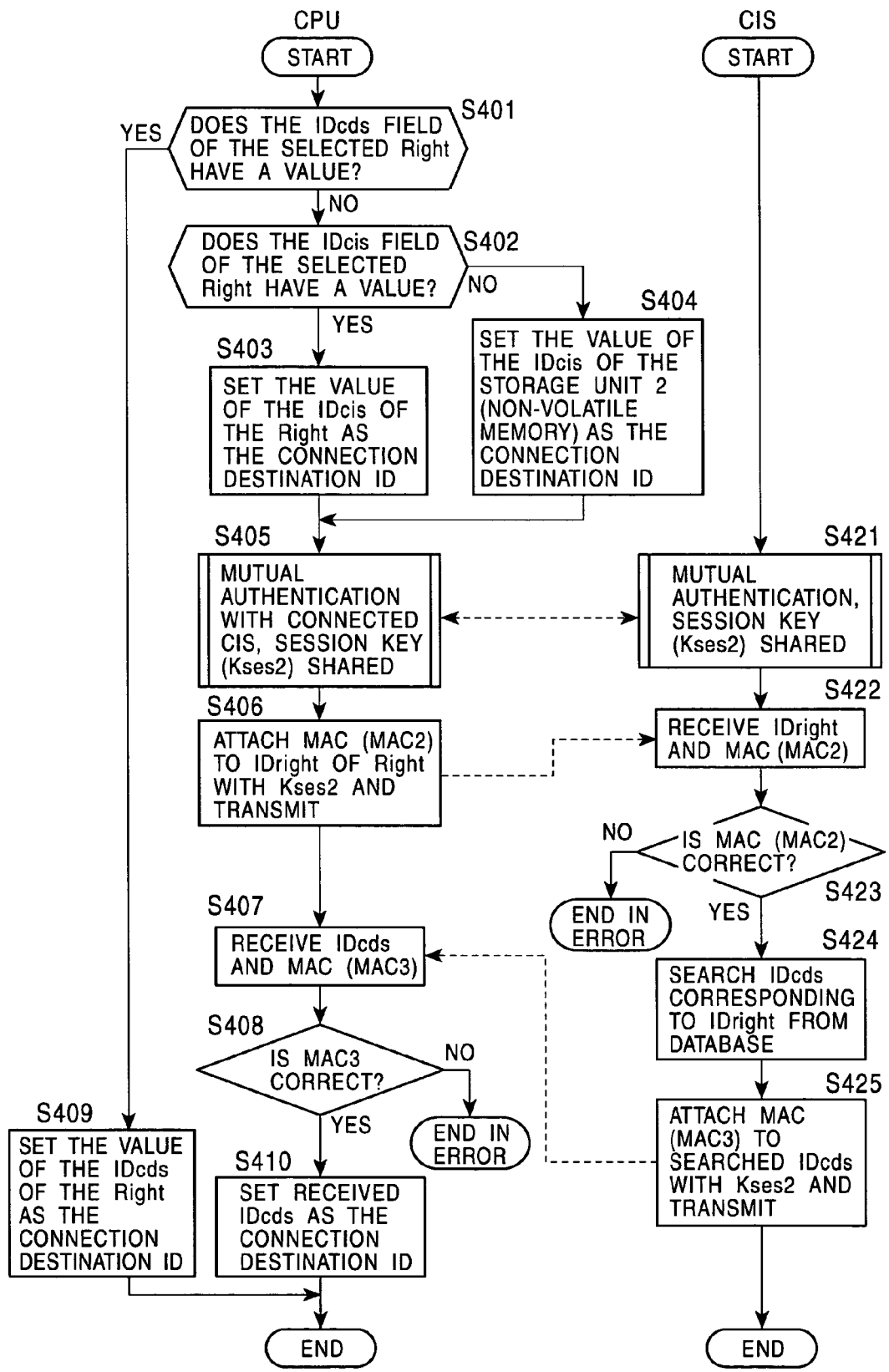
FIG. 15 is a flowchart describing contents distribution server (CDS) deciding processing.

The contents distribution server (CDS) deciding processing of steps S116, S120, and S131 will be described with reference to the processing flowchart in FIG. 15.

In step S401, the contents using device (CPT) judges whether or not the identification information (IDcds) field (see FIG. 9) of the contents distribution server (CDS) in the selected rights information (Right) has a value stored therein, i.e., whether or not IDcds is stored therein. In the event that this is stored therein, the stored value (IDcds) is set as the connection destination contents distribution server (CDS) in step S409.

In the event that the identification information (IDcds) field of the contents distribution server (CDS) in the selected rights information (Right) does not have a value stored therein, judgment is made in step S402 regarding whether or not the identification information (IDcis) field (see FIG. 9) of the index server (CIS) in the selected rights information (Right) has a value stored therein. In the event that this is stored, the storage value thereof (IDcis) is set as the destination of connection in step S403. In the event that this is not stored either, in step S404 the identification information (IDcis) of the index server (CIS) stored in the storage unit of the anti-tampering unit (see Code Table (e) in FIG. 6A) is set as the connection destination ID.

Next, mutual authentication and key sharing processing is executed between the contents using device (CPT) and the index server (CIS) set as the connection destination (S405 and S421). In the event that the mutual authentication fails, an error is recognized and the subsequent processing is aborted. Upon mutual authentication being established and the session key (Kses2) being shared, the contents using device (CPT) executes generating of a MAC (MAC2) for the rights information identifier (IDright) stored in the rights information (Right) selected earlier as corresponding to the contents to be used, applying the session key (Kses2), and transmits the MAC value (MAC2) along with the rights information identifier (IDright) to the index server (CIS).

In step S422, the index server (CIS) receives the data, executes the MAC verification processing in step S423, judges whether or not here has been tampering with the rights information identifier (IDright), and in the event that judgment is made that there has been tampering, the flow ends in error.

In the event that judgment is made that there has been no tampering, the flow proceeds to step S424, and the contents identifier (IDcont) contained in the received rights information identifier (IDright) (see FIGS. 9 through 10B) is obtained. Further, the contents distribution server identifier (IDcds) of a server capable of providing the contents set in the contents identifier (IDcont) is obtained from the database storage information (see Code Table (b) in FIG. 5B).

In step S425, the index server (CIS) attaches the MAC value (MAC3) generated applying the session key (Kses2) to the obtained contents distribution server identifier (IDcds), and transmits this to the contents using device (CPT).

The contents using device (CPT) receives the data in step S407, and executes MAC verification processing regarding the received data in step S408. In the event that the verification fails, the flow ends in error, and in the event that the verification is established, in step S410 the contents distribution server identifier (IDcds) is set as the connection destination contents distribution server for the received data.

Returning to FIG. 11, upon the contents distribution server (CDS) capable of distributing the contents corresponding to the selected rights information (Right) being decided by the CDS deciding processing, contents downloading processing is executed in steps S117, S103, and S141.

Figure 16:
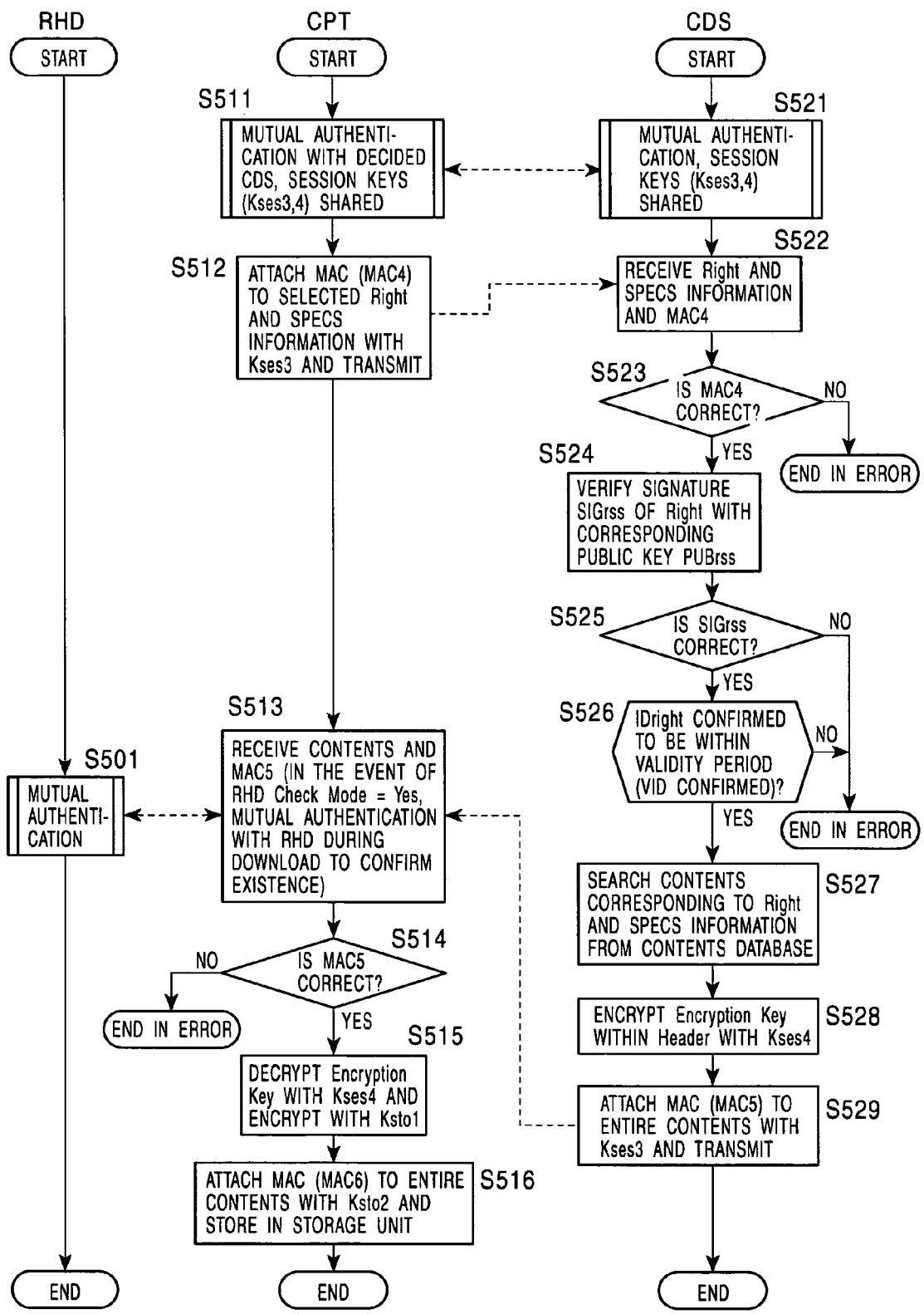
FIG. 16 is a flowchart describing contents downloading processing.

The contents downloading processing will be described with reference to the processing flowchart in FIG. 16. First, in steps S511 and S521, mutual authentication and key sharing processing are executed between the contents using device (CPT) and the contents distribution server (CDS) which is to execute distribution of the contents to be used. In the event that the mutual authentication fails, an error is recognized and the subsequent processing is aborted. Upon mutual authentication being established and two session key (Kses3 and Kses4) being shared, in step S512 the contents using device (CPT) executes generating of a MAC value (MAC4) applying the session key (Kses3), and attaches the MAC value (MAC4) to the selected rights information corresponding to the contents to be used and specs information, and transmits these to the contents distribution server (CDS).

Specs information is information regarding data formats and the like which the contents using device (CPT) is capable of receiving and playing, and as shown in FIG. 17, is information including audio playback capabilities, image playback capabilities, communication path settings information, and so forth. The contents distribution server (CDS) performs contents distribution with a data format appropriate for the contents using device (CPT) which is to receive distribution of the contents, based on this specs information.

In step S522, the contents distribution server (CDS) receives this data, executes MAC verification processing in step S523, judges whether or not there has been tampering with the rights information identifier (IDright) and so forth, and in the event that judgment is made that there has been tampering, the flow ends in error.

In the event that judgment is made that there has been no tampering, the flow proceeds to step S524, and signature verification processing (S525) is executed regarding the signature (SIGrss) stored in the received rights information (Right), applying the public key (PUBrss) corresponding to the secret key of the license server (RSS) applied to the signature. In the event that signature verification fails, judgment is made that there has been tampering, and the flow ends in error.

In the event that the signature verification is successful and judgment is made that there has been no tampering, the flow proceeds to step S526, and judgment is made regarding whether or not the rights information (Right) is within the valid period, and/or whether or not the remaining count is zero, based on the validity management information database (VID) (see FIG. 10B) according to the valid information code (Validation Code) contained in the rights information identifier (IDright) (see FIGS. 9 through 10B) stored in the received rights information (Right). In the event that the valid period has expired or the remaining count is zero, the flow ends in error.

In the event that the rights information (Right) is judged to be validly usable, contents corresponding to the rights information (Right) received from the contents using device (CPT) and the specs information are searched and obtained from the contents database in step S527.

Next, the flow proceeds to step S528, the encryption processing key (Encryption Key) within the header of the rights information (Right) is encrypted using the session key (Kses4) set as a shared key earlier, the flow proceeds to step S529, a MAC value (MAC5) applying the session key (Kses3) is attached to the contents file (see FIG. 8) corresponding to the received rights information (Right), and this is transmitted to the contents using device (CPT).

The contents using device (CPT) receives the data (S513), executes MAC verification for the received data (S514), and in the event that the MAC verification fails, the flow ends in error.

At the time of downloading data (S513), the mode information of the RHD check mode (see FIG. 8) within the header of the contents file is verified. In the event that the mode information is set to Yes, i.e., in the event that connection with the license storage device (RHD) is a precondition for playing the contents, authentication processing (S501) with the license storage device (RHD) is executed at the time of downloading the contents. In the event that is no connection with the license storage device (RHD), or in the event that authentication processing (S501) with the license storage device (RHD) fails, the contents download is aborted.

In step S515, the encryption processing key (Encryption Key) is decrypted using the session key (Kses4), and further, is re-encrypted using the storage key (Ksto1) (see Code Table (e) in FIG. 6A) therein. Further, in step S516, the MAC value (MAC5) generated applying the storage key (Ksto2) is attached to the contents file and stored in the storage unit. The storage format of the contents file in the contents using device (CPT) is basically the same as that of the contents file shown in FIG. 8, with the encryption processing key (Encryption Key) within the contents file being encrypted with the storage key (Kstol).

Also, in the event of playing such stored contents as well, authentication processing (S501) with the license storage device (RHD) is performed. In the event that there is no connection with the license storage device (RHD), or in the event that authentication processing (S501) with the license storage device (RHD) fails, the contents are not played. This playing processing will now be described.

Figure 18:
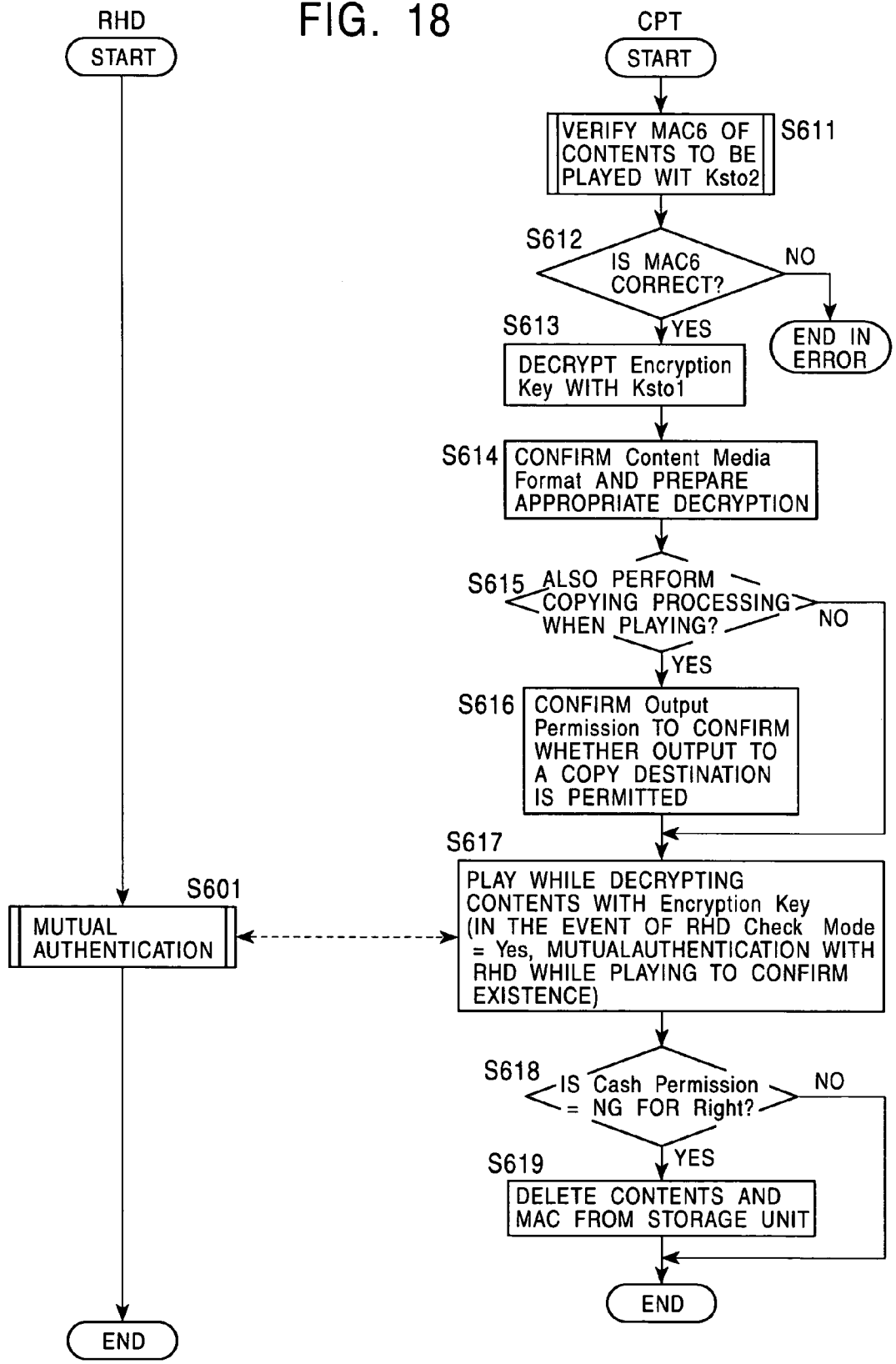
FIG. 18 is a flowchart describing contents playing processing.

The contents playing processing shown in the flowchart in FIG. 11 (steps S188 and S104) will be described with reference to the flowchart in FIG. 18. The contents playing processing illustrated in this flowchart is playing processing for download contents, i.e., playing processing for contents which have already been downloaded to the storage unit of the contents using device (CPT).

First, in step S611, the contents using device (CPT) reads out the contents file (see FIG. 8) stored in the storage unit, and calculates the MAC (MAC6) of the contents file read out, applying the storage key (Ksto2). Next, in step S612, matching is performed with the MAC stored in the storage unit along with the contents file (see step S516 in FIG. 16), and MAC verification is executed. In the event that the calculated MAC and the stored MAC match, the contents file is judged to be a legitimate file, and the flow proceeds to step S613. In the event that the MACs do not agree, the flow ends in error.

In step S613, the encrypted encryption processing key (Encryption Key) within the contents file stored in the storage unit by the storage key (Ksto1) is decrypted with the storage key (Ksto1).

In step S614, the media format of the contents file (see FIG. 8) is confirmed, and appropriate decryption processing such as MPEG processing for example is carried out. In step S615, judgement is made regarding whether or not copy processing is to be performed at the time of playing, and in the event of performing copy processing, the output permission of the contents file (Output Permission) (see FIG. 8) is confirmed in step S616, so as to execute copy processing preparation following the output permission information.

Next, in step S617, playing processing is executed while decrypting the encrypted contents using the encryption processing key (Encryption Key) obtained in step S613.

In the event that the RHD check mode of the contents file is set to Yes, i.e., in the event that the license storage device (RHD) being connected to the contents using device (CPT) at the time of the contents using device (CPT) playing the contents is a precondition for playing these contents, authentication processing with the license storage device (RHD) is executed (S601). In the event that there is no connection with the license storage device (RHD), or in the event that authentication processing (S601) with the license storage device (RHD) fails, the contents are not played.

In step S618, judgment is made regarding whether or not caching is not permitted (Cache NG) as the settings of Download Type information of the rights information (Right) (see FIG. 9), and in the event that the settings are Cache NG, the contents and MAC are deleted from the storage unit in step S619, and the playing processing is ended. In the in the event that the settings are Cache OK instead of Cache NG, the contents and MAC are not deleted in step S619 but left in the storage unit, and the processing ends.

Figure 19:
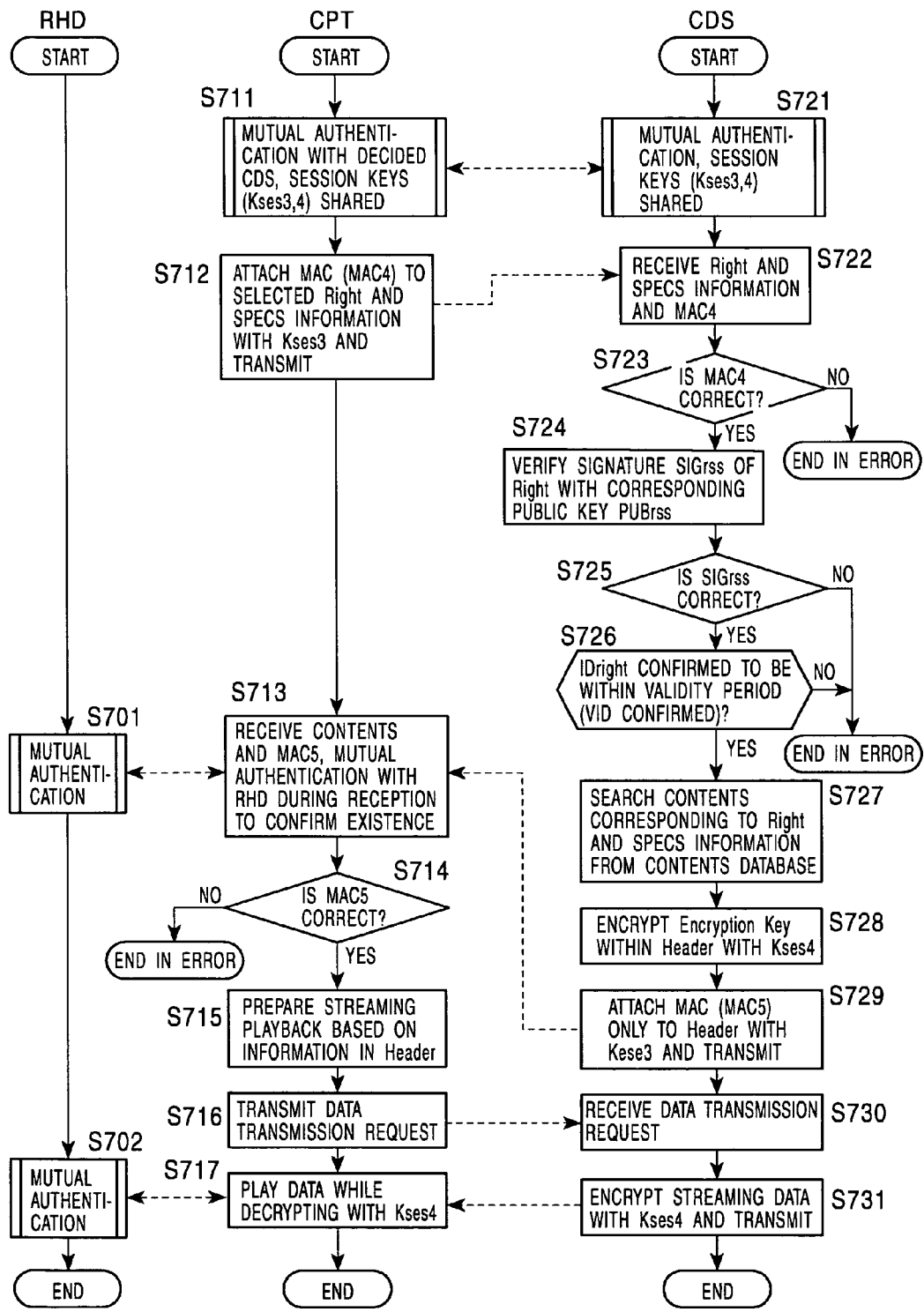
FIG. 19 is a flowchart describing streaming playing processing.

Next, the streaming play processing in steps S121 and S142 in the flowchart in FIG. 11 will be described with reference to the processing flowchart in FIG. 19. First, in steps S711 and S721, mutual authentication and key sharing processing is executed between the contents using device (CPT) and the contents distribution server (CDS) which is to execute streaming distribution of the contents to be used. In the event that the mutual authentication fails, an error is recognized and the subsequent processing is aborted.

Upon mutual authentication being established and two session key (Kses3 and Kses4) being shared, in step S712 the contents using device (CPT) executes generating of a MAC value (MAC4) applying the session key (Kses3), and attaches the MAC value (MAC4) to the selected rights information (Right) corresponding to the contents to be used and specs information, to the contents distribution server (CDS).

As described above with reference to FIG. 17, specs information is information regarding data formats and the like which the contents using device (CPT) is capable of receiving and playing, and is information including audio playback capabilities, image playback capabilities, communication path settings information, and so forth. The contents distribution server (CDS) performs streaming distribution of the contents with data format appropriate for the contents using device (CPT) which is to receive distribution of the contents, based on this specs information.

In step S722, the contents distribution server (CDS) receives this data, executes MAC (MAC4) verification processing in step S723, judges whether or not there has been tampering with the rights information (Right) and so forth, and in the event that judgment is made that there has been tampering, the flow ends in error.

In the event that judgment is made that there has been no tampering, the flow proceeds to step S724, and signature verification processing (S725) is executed regarding the signature (SIGrss) stored in the received rights information (Right), applying the public key (PUBrss) corresponding to the secret key of the license server (RSS) applied to the signature. In the event that signature verification fails, judgment is made that there has been tampering, and the flow ends in error.

In the event that the signature verification is successful and judgment is made that there has been no tampering, the flow proceeds to step S726, and judgment is made regarding whether or not the rights information (Right) is within the valid period, and/or whether or not the remaining count is zero, based on the validity management information database (VID) (see FIG. 10B) according to the valid information code (Validation Code) contained in the rights information identifier (IDright) (see FIGS. 9 through 10B) stored in the received rights information (Right). In the event that the valid period has expired or the remaining count is zero, the flow ends in error.

In the event that the rights information (Right) is judged to be validly usable, contents corresponding to the rights information (Right) received from the contents using device (CPT) and the specs information are searched and obtained from the contents database in step S727.

Next, the flow proceeds to step S728, the encryption processing key (Encryption Key) within the header of the rights information (Right) is encrypted using the session key (Kses4) set as a shared key earlier, the flow proceeds to step S729, a MAC value (MAC5) applying the session key (Kses3) is attached to only the header of the contents file (see FIG. 8) corresponding to the received rights information (Right), and this is transmitted to the contents using device (CPT).

The contents using device (CPT) receives the header and MAC (MAC5) (S713), executes MAC verification for the received data (S714), and in the event that the MAC verification fails, the flow ends in error.

At the time of receiving the contents header (S713), the mode information of the RHD check mode (see FIG. 8) within the header of the contents file is verified. In the event that the mode information is set to Yes, i.e., in the event that connection with the license storage device (RHD) is a precondition for playing the contents, authentication processing (S701) with the license storage device (RHD) is executed at the time of downloading the contents. In the event that there is no connection with the license storage device (RHD), or in the event that authentication processing (S701) with the license storage device (RHD) fails, subsequent playing of contents is not executed.

In the event that the MAC verification is established in step S714 and the header information is confirmed to be without data tampering, the flow proceeds to step S715, where playing processing preparations are made according to the header information. In step S716, a request is made to the contents distribution server (CDS) for streaming distribution of contents. In step S730, the contents distribution server (CDS) receives the request data, and in step S731, the contents data corresponding to the header information already sent is encrypted with the session key (Ksese4) and transmitted.

In step S717, the contents using device (CPT) executes streaming playing processing while receiving the encrypted contents and decrypting the encrypted contents using the session key (Kses4).

With streaming playing as well, the contents using device (CPT) occasionally performs authentication processing with the license storage device (RHD) (S702). In the event that there is no connection with the license storage device (RHD), or in the event that authentication processing (S601) with the license storage device (RHD) fails, the playing of the contents is stopped.

[5. Processing for Purchasing and Storing Rights Information (Right)]

Figure 20:
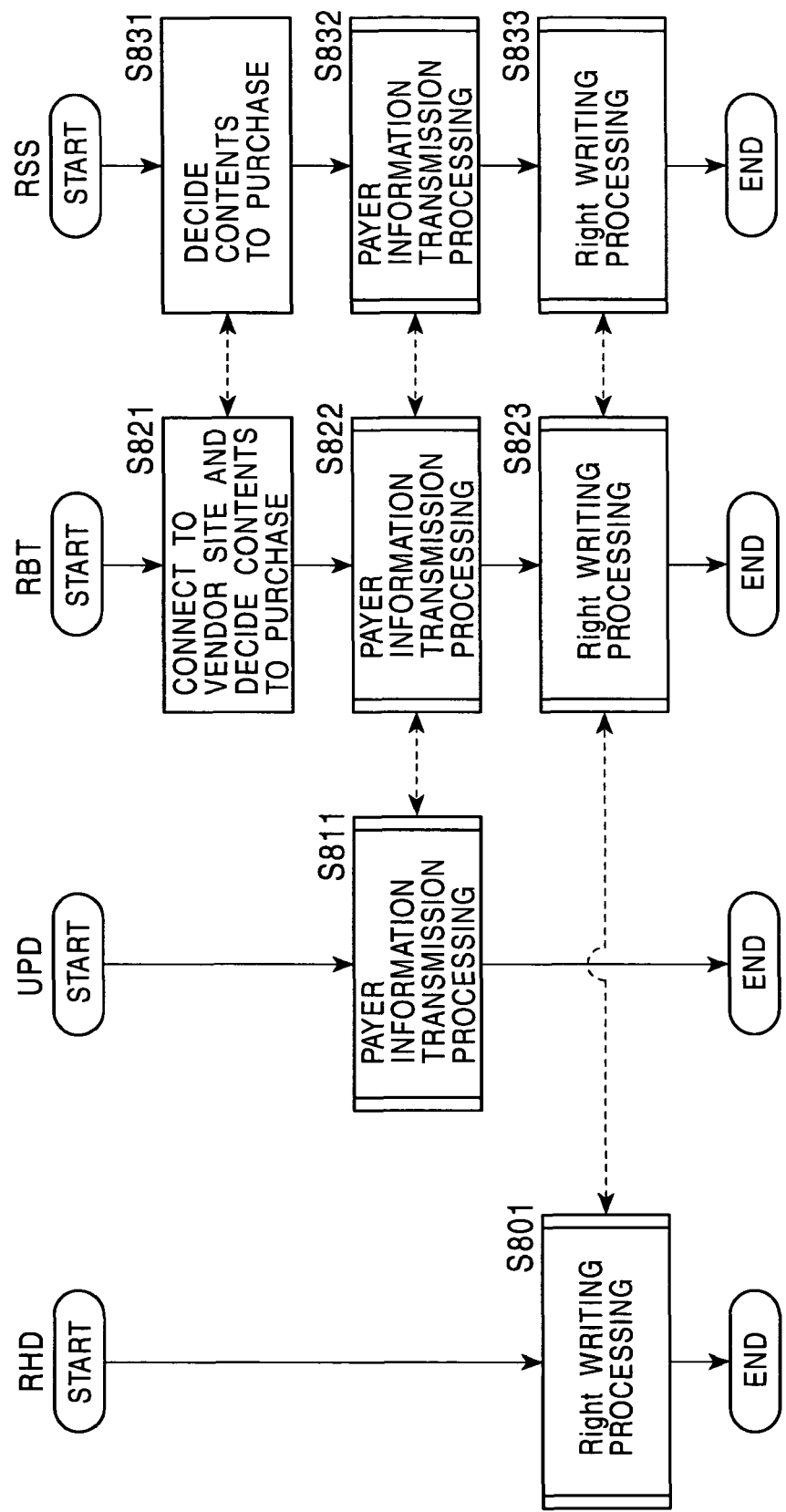
FIG. 20 is a flowchart describing purchasing of rights information (Right) and storage processing regarding a license storage device (RHD)

Next, the processing for purchasing rights information (right) and the processing for storing in the license storage device (RHD) will be described with the flowcharts in FIG. 20 on.

First, the processing for purchasing rights information (Right) will be described with reference to the flowchart in FIG. 20. The flowchart in FIG. 20 illustrates the procedures for obtaining rights information (Right) online via a network and storing in a license storage device (RHD).

First, a user who desires to obtain rights information (Right) connects to a contents vending site using a license purchasing device (RBT), decides the contents to be used or played, and transmits a contents ID (IDcont) serving as contents specifying information to a license server (RSS) (step S821 and S831).

Next, in steps S811, S822, and S832, the license purchasing device (RBT) transmits payer information such as credit card No. and the like to the license server (RSS) from a user charges payment device (UPD) which either stores or is capable of obtaining user settlement information via the license purchasing device (RBT). The license server (RSS) performs settlement processing based on the payer information.

Figure 21:
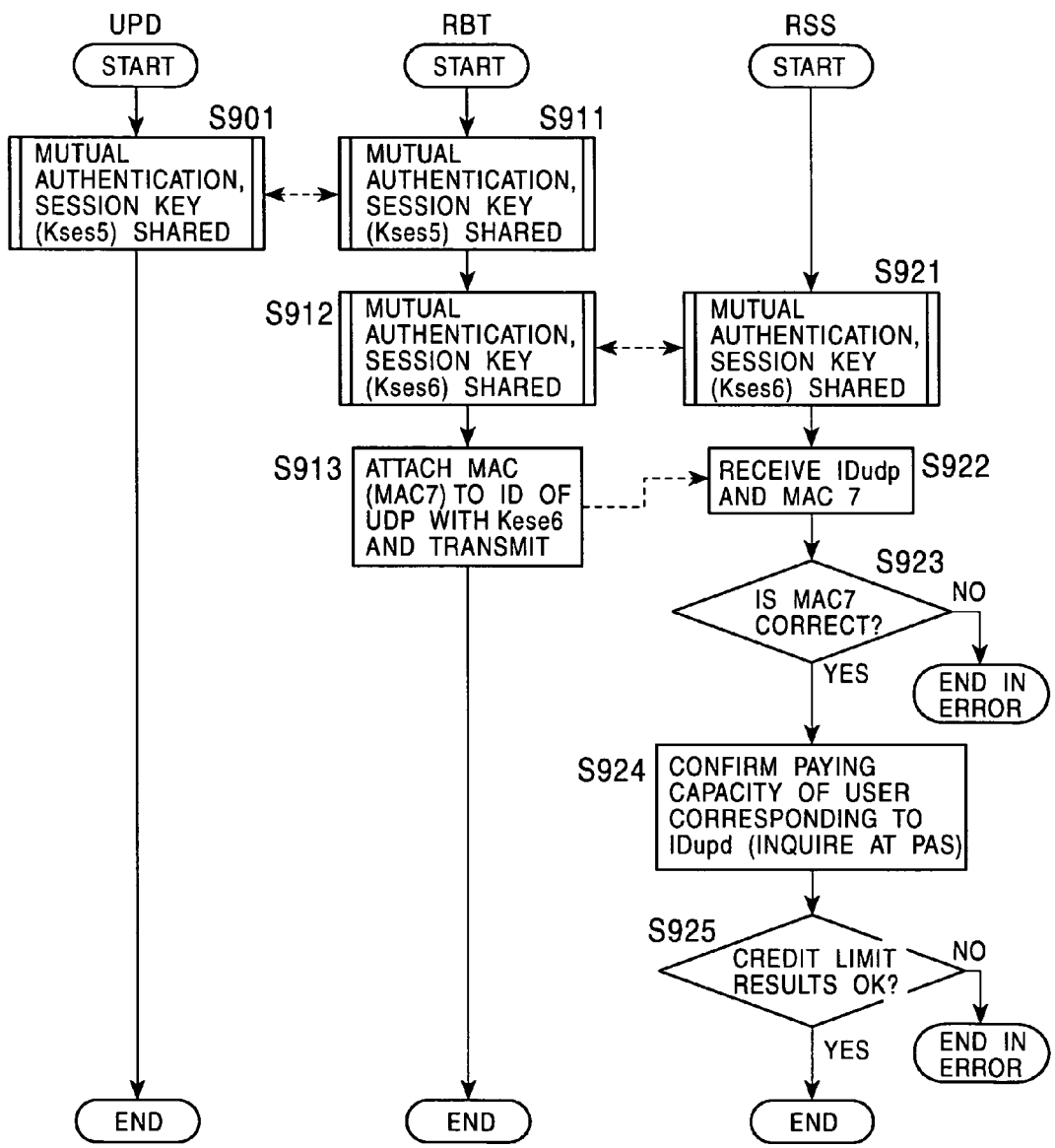
FIG. 21 is a flowchart describing the details of settlement processing.

The details of the settlement processing executed in the steps S811, S822, and S832 will be described with reference to the processing flowchart in FIG. 21. First, mutual authentication and key sharing processing is executed between the license purchasing device (RBT) and the user charges payment device (UPD) (S901 and S911), and a session key (Kses5) is shared. In the event that the mutual authentication fails, the flow ends in error.

Upon mutual authentication being established between the license purchasing device (RBT) and the user charges payment device (UPD) and the session key being shared, mutual authentication and key sharing processing is executed between the license purchasing device (RBT) and the license server (RSS) (S912 and S921), and a session key (Kses6) is shared. In the event that the mutual authentication fails, the flow ends in error.

Upon mutual authentication and key sharing being established between the license purchasing device (RBT) and the license server (RSS), in step S913 the license purchasing device (RBT) attaches the MAC (MAC7) generated with the session key (Kses6) to the ID of the user charges payment device (UPD) and transmits this to the license server (RSS).

In step S922, the license server (RSS) receives the transmitted data, MAC verification is performed (S923), and in the event that the calculated MAC and the received MAC do not match, the flow ends in error. In the event that MAC verification is established, and the data is confirmed to be without tampering, in step S924 the license server (RSS) transmits settlement information to a rights charges payment administration server (PAS) which executes settlement processing, the validity of the settlement information and permissibility of the settlement processing is judged at the rights charges payment administration server (PAS) based on the credit information provided to each user charges payment device (UPD), and in the event that settlement processing can be made, the settlement processing is executed, and the results are notified to the license server (RSS). Based on this notification, in the event that settlement has not been executed, the license server (RSS) ends in error, and in the event that settlement has been executed, the license server (RSS) proceeds to transmission processing of the rights information (Right) to the license purchasing device (RBT).

Returning to FIG. 20, upon the settlement processing succeeding in steps S811, S822, and S832, next, writing of the rights information (Right) received by the license purchasing device (RBT) to the license storage device (RHD) is performed in steps S823 and S801.

The details of writing the rights information (Right) to the license storage device (RHD) will be described with reference to the processing in the flowchart in FIG. 22.

First, mutual authentication and key sharing processing is executed between the license purchasing device (RBT) and the license storage device (RHD) (S951 and S961), and a session key (Kses7) is shared. In the event that the mutual authentication fails, the flow ends in error.

Upon mutual authentication being established between the license purchasing device (RBT) and the license storage device (RHD) and the session key being shared, in step S962 the license purchasing device (RBT) attaches a MAC (MAC8) to the ID (IDrhd) of the license storage device (RHD) applying the session key (Kses7), and transmits this to the license server (RSS).

In step S971, the license server (RSS) receives the transmitted data, executes MAC verification for the received data (S972), and in the event that the MAC verification between the calculated MAC and the received MAC fails, the flow ends in error. In the event that the MAC verification is established and the data is confirmed to be without data tampering, in step S973 the license server (RSS) generates rights information (Right) (see FIG. 9) corresponding to the contents which are to be used or played. The ID (IDrhd) of the license storage device (RHD) which has been received from the license purchasing device (RBT) and whose legitimacy has been verified, is stored in the rights information (Right).

Further, in step S974, the licenser server (RSS) attaches a signature to the rights information (Right) with its own secret key. In step S975, an entry is set in the validity management information database (VID) (see FIG. 10B), depending on the usage conditions of the contents. As shown in FIG. 10B, the validity management information database (VID) stores the information of: a contents identifier (IDcont); validity information code (Validation Code); starting date-and-time (Start) of the period over which the contents can be used; the ending date-and-time thereof (End); and the number of times remaining that the contents can be used (Remaining Count); these being set based on the contents usage conditions.

Next, in step S976, a MAC (MAC9) is attached to the generated rights information (Right) applying the session key (Kses6), and this is transmitted to the license purchasing device (RBT). The license purchasing device (RBT) receives the rights information (Right) and the MAC9 (S963), performs MAC verification (S964), and in the event that the verification fails, the flow ends in error.

In the event that the MAC verification is established, in step S965 the MAC (MAC10) generated applying the session key (Kses7) is attached to the received rights information (Right), and transmitted to the license storage device (RHD) The license storage device (RHD) receives the rights information (Right) and the MAC10 (S952), performs MAC verification (S953), and in the event that the verification fails, the flow ends in error. In the event that the MAC verification is established, the received rights information (Right) is written to the storage unit in step S954, and the processing ends.

Due to the above-described processing, the rights information (Right) is stored in the license storage device (RHD), and at the time of using the contents, the rights information (Right) is output from the license storage device (RHD) to the contents using device (CPT), and further transmitted to the contents distribution server (CSS), and legitimacy verification of the rights information (Right) is executed at the contents distribution server (CSS) as described above, such that contents corresponding to the rights information (Right) is transmitted to the contents using device (CPT), and the contents using device (CPT) can play or use the contents.

Thus, with the configuration according to the present invention, the same contents can be used or played with multiple contents using devices (CPT) one after another as long as one license storage device (RHD) is provided. Also, the signature of the issuer, such as the licenser server (RSS) for example, is attached to the rights information (Right), and signature verification is performed at the time of using, so unauthorized use of contents by rights information (Right) illegitimately generated or tampered with can be eliminated.

The present invention has been described in detail with reference to specific embodiments, but it is fully apparent that one skilled in the art can make various modifications and substitutions to the embodiments without departing from the spirit and scope of the present invention. That is to say, the present invention has been disclosed by way of embodiments as examples, so the embodiments should be interpreted illustratively and not restrictively, and the present invention is by no way restricted except as by the appended Claims.

Note that the series of processing described in the specification can be executed by hardware, software, or a combination of both. In the event of executing the processing by software, a program having code for the processing sequence can be installed in memory within a computer built into dedicated hardware and executed, or can be installed in a general-purpose computer capable of various types of processing. For example, the program can be stored, either temporarily or permanently, in a hard disk or ROM (Read Only Memory) serving as a recording medium, or in a removable recording medium such as a floppy disk, CD-ROM (Compact Disk Read Only Memory), MO (Magneto-Optical) disk, DVD (Digital Versatile Disk), magnetic disk, semiconductor memory, or the like. Such removable media can be provided as so-called packaged software.

Further, besides being installed to a computer from such a removable recording medium as described above, the program may be transferred to the computer wirelessly from a download site, or transferred to the computer via a cable network such as a LAN (Local Area Network) or the Internet, and the computer can receive the program being transferred in this way and install the program in an internal recording medium such as a hard disk or the like.

Moreover, the various types of processes described in the present Specification are not restricted to being executed in that particular time-sequence; rather, the processes may be executed in parallel or individually, as necessary and depending on the processing capabilities of the device executing the processing. Also, as mentioned earlier, it should be understood that the term "system" as used in the present Specification refers to a logical group configuration of multiple devices, and is by no means limited to arrangements wherein all of the devices are housed within the same enclosure.

What is claimed is:

1. An information processing device serving as a contents playing device that plays contents, said information processing device comprising:
   a communication unit configured to execute communication processing with a license storage device storing rights information serving as usage rights information of contents associated with a user of the information processing device, and communication processing with a contents distribution server;
   an encryption processing unit configured to execute encryption processing including authentication processing in said communication processing; and
   a control unit configured to execute processing control for inputting rights information corresponding to contents from said license storage device, via said communication unit, to transmit said input rights information, which indicates rights to receive streaming contents, to said contents distribution server, to receive streaming contents corresponding to said rights information from said contents distribution server, and to play said streaming contents,
   wherein the control unit is configured to perform, subsequent to a beginning of playing of said streaming contents by said information processing device serving as the contents playing device, subsequent authentication processing with the license storage device while the playing of the streaming contents is occurring, and is configured to stop the playing of said streaming contents when the subsequent authentication processing with the license storage device fails, said subsequent authentication at least confirming that the license storage device remains in communication with the information processing device serving as the contents playing device while the playing of the streaming contents is occurring.

2. An information processing device according to claim 1, wherein said encryption processing unit has a configuration for executing verification processing for a tampering verification value attached to contents-corresponding rights information input from said license storage device, said encryption processing unit executing authentication processing at least once while the information processing device is receiving said streaming contents.

3. An information processing device according to claim 1, wherein said encryption processing unit executes mutual authentication with said license storage device;

and wherein said control unit has a configuration for executing input processing of contents-corresponding rights information input from said license storage device via said communication unit, with the establishment of said mutual verification as a precondition thereof.

4. An information processing device according to claim 1, wherein said encryption processing unit has a configuration for executing mutual authentication and key-sharing processing with said license storage device, and for executing verification processing for a tampering verification value attached to contents-corresponding rights information input from said license storage device via said communication unit, applying a key generated in said key-sharing processing.

5. An information processing device according to claim 1, wherein said encryption processing unit has a configuration for executing mutual authentication and key-sharing processing with said contents distribution server, and for executing verification processing for a tampering verification value attached to a contents file from said contents distribution server via said communication unit, applying a key generated in said key-sharing processing.

6. An information processing device according to claim 1, wherein said encryption processing unit has a configuration for executing mutual authentication and key-sharing processing with said contents distribution server, and for executing decryption of an encrypted contents encryption processing key attached to a contents file from said contents distribution server via said communication unit, applying a key generated in said key-sharing processing.

7. An information processing device according to claim 1, wherein header information of a contents file received from said contents distribution server contains RHD check mode information setting whether or not to take connection with said license storage device at the time of playing contents as a precondition thereof;

and wherein said encryption processing unit executes mutual authentication processing with said license storage device for contents playing processing wherein said RHD check mode information takes connection with said license storage device at the time of playing contents as a precondition thereof; and wherein said control unit performs contents playing processing with establishment of said authentication as a precondition thereof.

8. An information processing device according to claim 1, wherein header information of a contents file received from said contents distribution server contains output control information of contents; and wherein said control unit executes output control of contents following said output control information.

9. An information processing device according to claim 1, wherein said rights information contains contents distribution server information or index server information of a server capable of providing streaming contents corresponding to said rights information; and wherein said control unit is of a configuration for executing processing for deciding a connection destination based on said contents distribution server information or said index server information.

10. An information processing device according to claim 1, wherein said control unit is of a configuration for executing processing for transmitting, to a contents distribution server providing contents, specs information including data format information of data formats playable at the information processing device serving as a contents playing device, along with said rights information.

11. An information processing device according to claim 1, wherein a digital signature is attached to the rights information by using a secret key of the license storage device.

12. An information processing device according to claim 1, wherein the rights information includes a time period when the information processing device can receive the streaming contents from the distribution server.

13. An information processing device serving as a license storage device that stores rights information which is contents use rights information, said information processing device comprising:

a storage unit configured to store said use rights information associated with a user of the information processing device;

a communication unit configured to execute communication processing with a contents playing device for playing contents;

an encryption processing unit configured to execute encryption processing including authentication processing in said communication processing via said communication unit, the encryption processing unit executing authentication processing with said contents playing device at least once subsequent to a beginning of playing of streaming contents by said contents playing device and while the playing of the streaming contents is occurring, said authentication processing at least confirming that the license storage device remains in communication with the contents playing device while the playing of the streaming contents is occurring; and a control unit for executing output processing of contents-corresponding rights information via said communication unit with regard to said contents playing device, with establishment of mutual authentication with said contents playing device as a precondition thereof.

14. An information processing device according to claim 13, wherein said encryption processing unit has a configuration for executing mutual authentication and key-sharing processing with said contents playing device, and for executing processing for setting a tampering verification value to rights information to be output to said contents playing device, applying a key generated in said key-sharing processing.

15. An information processing device according to claim 13, wherein said encryption processing unit executes mutual authentication with a license purchasing device which receives rights information from a license server via a network; and wherein said control unit executes input processing of contents-corresponding rights information via said communication unit, with establishment of said mutual authentication as a precondition thereof.

16. An information processing device according to claim 13, wherein said encryption processing unit has a configuration for executing mutual authentication and key-sharing processing with said license purchasing device, and for executing verification processing for a tampering verification value attached to contents-corresponding rights information input from said license purchasing device via said communication unit, applying a key generated in said key-sharing processing.

* * * * *